(12) United States Patent
Mak et al.

(10) Patent No.: US 11,442,593 B2
(45) Date of Patent: Sep. 13, 2022

(54) DYNAMIC BROWSER STAGE

(71) Applicant: Magic Leap, Inc., Plantation, FL (US)

(72) Inventors: Genevieve Mak, Fort Lauderdale, FL (US); Aleksei Marchenko, Sunnyvale, CA (US); Alfred Yu-Chih Tarng, Plantation, FL (US); Damian Franco, Miami, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/110,175

(22) Filed: Dec. 2, 2020

(65) Prior Publication Data

US 2021/0173547 A1 Jun. 10, 2021

Related U.S. Application Data

(60) Provisional application No. 62/944,921, filed on Dec. 6, 2019.

(51) Int. Cl.
*G06F 3/04815* (2022.01)
*G06F 16/954* (2019.01)
*H04N 13/332* (2018.01)

(52) U.S. Cl.
CPC ........ *G06F 3/04815* (2013.01); *G06F 16/954* (2019.01); *H04N 13/332* (2018.05)

(58) Field of Classification Search
None
See application file for complete search history.

(56) References Cited

U.S. PATENT DOCUMENTS

| 6,091,422 | A | * | 7/2000 | Ouaknine | G06T 19/00 345/419 |
|---|---|---|---|---|---|
| 6,850,221 | B1 | | 2/2005 | Tickle | |
| 9,448,687 | B1 | | 9/2016 | McKenzie et al. | |
| 2002/0163545 | A1 | * | 11/2002 | Hii | G06F 3/0483 715/838 |
| 2006/0028436 | A1 | | 2/2006 | Armstrong | |
| 2007/0081123 | A1 | | 4/2007 | Lewis | |
| 2011/0310227 | A1 | | 12/2011 | Konertz et al. | |
| 2012/0127062 | A1 | | 5/2012 | Bar-Zeev et al. | |
| 2012/0162549 | A1 | | 6/2012 | Gao et al. | |

(Continued)

FOREIGN PATENT DOCUMENTS

WO WO 2021/113322 6/2021

OTHER PUBLICATIONS

ARToolKit: https://web.archive.org/web/20051013062315/http://www.hitl.washington.edu:80/artoolkit/documentation/hardware.htm, archived Oct. 13, 2005.

(Continued)

*Primary Examiner* — Mandrita Brahmachari
(74) *Attorney, Agent, or Firm* — Knobbe, Martens, Olson & Bear, LLP

(57) ABSTRACT

The disclosure relates to systems and methods for displaying three-dimensional (3D) content in a spatial 3D environment. The systems and methods can include receiving a request from web domain to display 3D content of certain dimensions at a location within the spatial 3D environment, identifying whether the placement is within an authorized portion of the spatial 3D environment, expanding the authorized portion of the 3D spatial environment to display the 3D content based on a user authorization to resize the authorized portion, and displaying the 3D content.

19 Claims, 19 Drawing Sheets

(56) References Cited

U.S. PATENT DOCUMENTS

| | | |
|---|---|---|
| 2013/0082922 A1 | 4/2013 | Milter |
| 2013/0117377 A1 | 5/2013 | Miller |
| 2013/0125027 A1 | 5/2013 | Abovitz |
| 2013/0135344 A1* | 5/2013 | Stirbu .................. G09G 5/00 345/629 |
| 2013/0208234 A1 | 8/2013 | Lewis |
| 2013/0242262 A1 | 9/2013 | Lewis |
| 2014/0071539 A1 | 3/2014 | Gao |
| 2014/0114845 A1* | 4/2014 | Rogers ............. G06Q 20/145 705/39 |
| 2014/0177023 A1 | 6/2014 | Gao et al. |
| 2014/0218468 A1 | 8/2014 | Gao et al. |
| 2014/0267400 A1* | 9/2014 | Mabbutt .............. G06F 1/163 345/633 |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2017/0256096 A1 | 9/2017 | Faaborg et al. |
| 2019/0122440 A1 | 4/2019 | Barros et al. |
| 2019/0258365 A1 | 8/2019 | Zurmoehle et al. |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

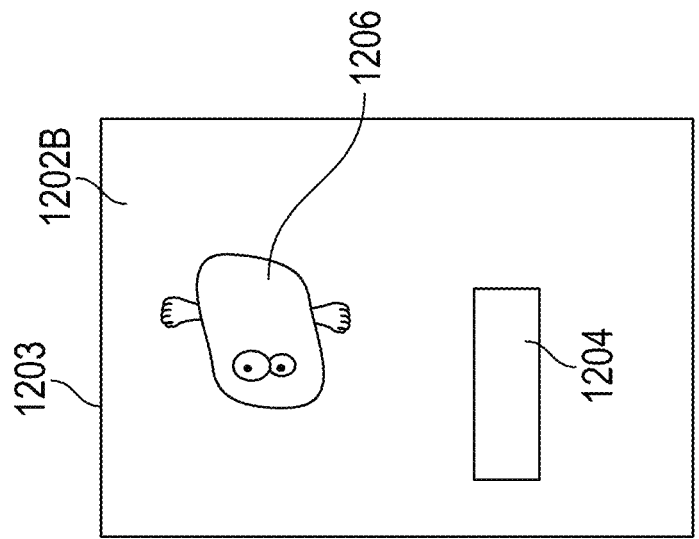
FIG. 12A2
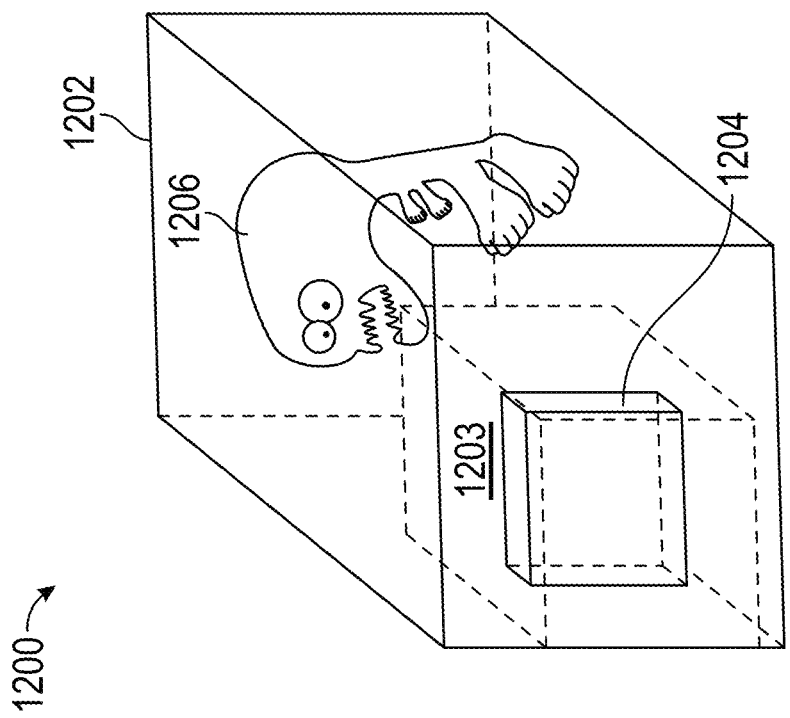
FIG. 12A1

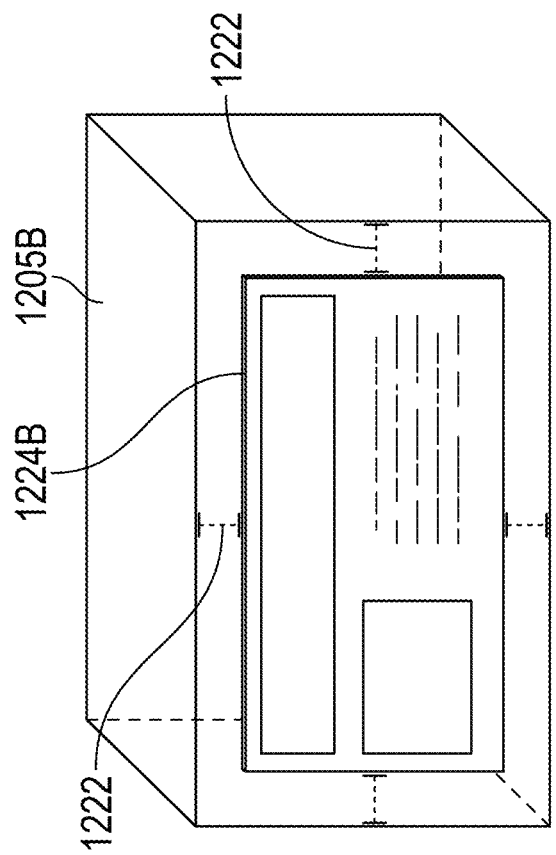
FIG. 12B2
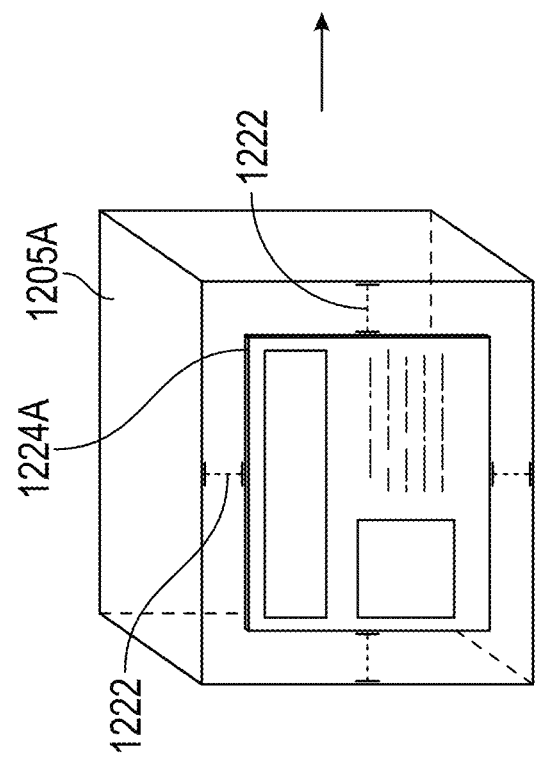
FIG. 12B1

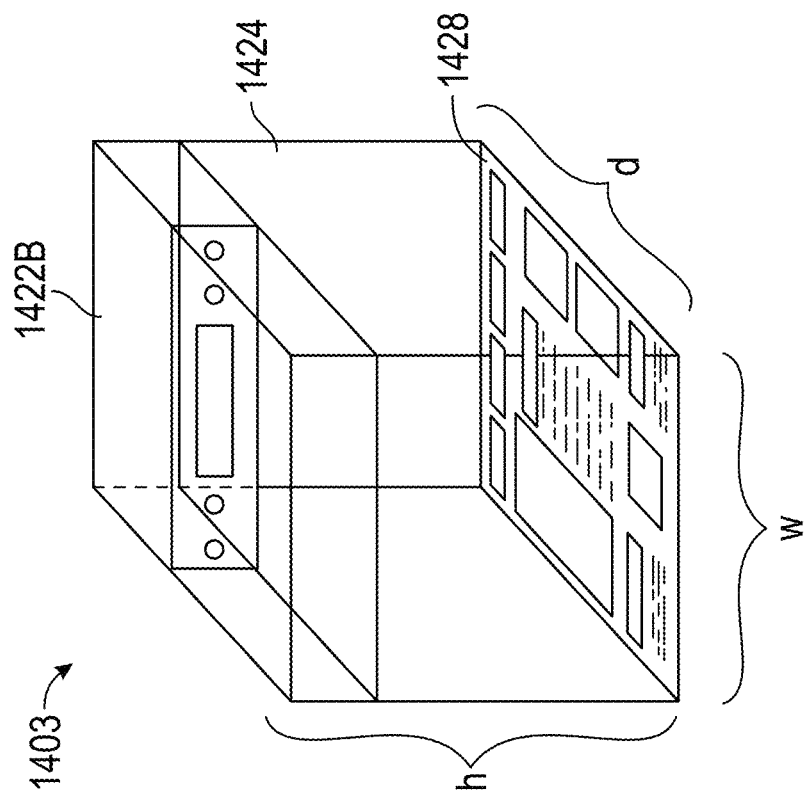
FIG. 14B2
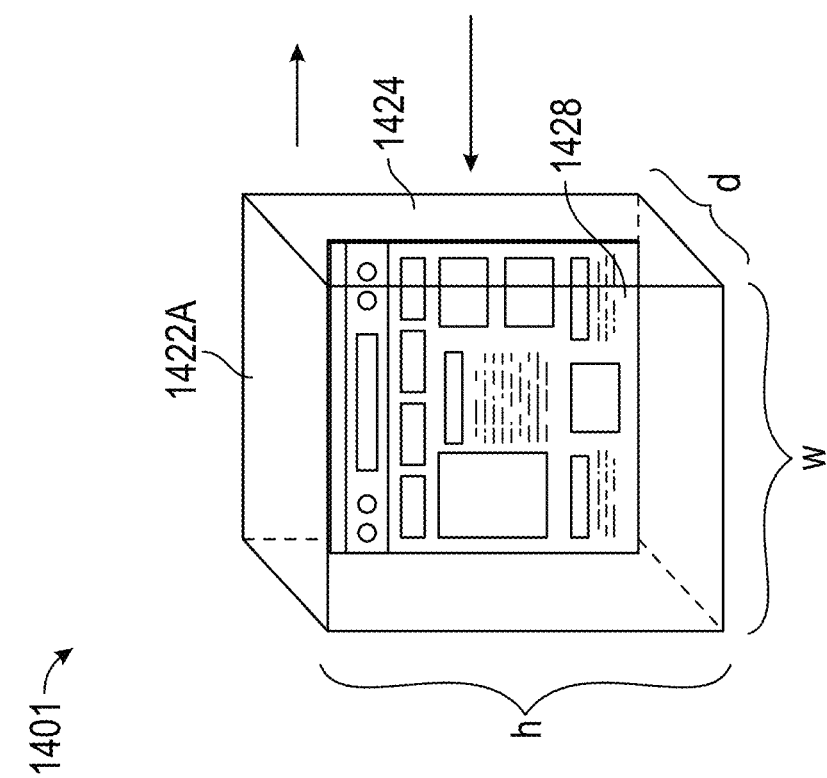
FIG. 14B1

DYNAMIC BROWSER STAGE

FIELD

The present disclosure generally relates to systems and methods to facilitate interactive virtual or augmented reality environments for one or more users.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects coexist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

SUMMARY

Embodiments of the present disclosure are directed to devices, systems, and methods for facilitating virtual or augmented reality interaction for one or more users.

Further details of features, objects, and advantages of the disclosure are described below in the detailed description, drawings, and claims. Both the foregoing general description and the following detailed description are exemplary and explanatory and are not intended to be limiting as to the scope of the disclosure.

In some configurations, a display system for displaying virtual content in a three-dimensional (3D) spatial environment can include: a head-mounted display configured to present virtual content to an eye of a user of the display system and circuitry in communication with the head-mounted display. The circuitry can be configured to: receive a request to access 3D web based content; identify parameters associated with the 3D web based content comprising at least one of: a location in the 3D spatial environment of the user to display the 3D web based content, an orientation of the 3D content, or dimensions of the 3D content; determine whether the 3D content can be displayed in an authorized portion of the 3D spatial environment of the user based on the parameters; in response to determining that the 3D content cannot be displayed in the authorized portion of the 3D spatial environment, resize the authorized portion to allow display of the 3D content in the resized authorized portion.

In some configurations, a display system for displaying virtual content in a three-dimensional (3D) spatial environment can include: a head-mounted display configured to present virtual content to an eye of a user of the display system and circuitry in communication with the head-mounted display. The circuitry can be configured to: receive a request to access content; display the content in an authorized portion of the 3D spatial environment of the user in a first orientation; receive a request to display the content in the 3D spatial environment of the user in a second orientation; determine whether the content can be displayed in the authorized portion of the 3D spatial environment of the user in the second orientation; and in response to determining that the content cannot be displayed in the authorized portion of the 3D spatial environment in the second orientation, resize the authorized portion to allow display of the content in the second orientation within the resized authorized portion.

In some configurations, a display system for displaying virtual content in a three-dimensional (3D) spatial environment, the display system can include: a head-mounted display configured to present virtual content to an eye of a user of the display system and circuitry in communication with the head-mounted display. The circuitry can be configured to: receive a request to access 3D content; identify parameters associated with the 3D content comprising at least one of: a location in the 3D spatial environment of the user to display the 3D content, an orientation of the 3D content, and dimensions of the 3D content; determine whether the 3D content can be displayed in an authorized portion of the 3D spatial environment of the user based on the parameters; and in response to determining that the 3D content cannot be displayed in the authorized portion of the 3D spatial environment, display a representation of the 3D content at the location in the 3D spatial environment.

BRIEF DESCRIPTION OF THE DRAWINGS

Throughout the drawings, reference numbers are re-used to indicate correspondence between referenced elements. The following drawings and the associated descriptions are provided to illustrate embodiments of the present disclosure and do not limit the scope of the claims.

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIGS. 12A1 and 12A2 illustrate an example of placing 3D content in 3D volume.

FIGS. 12B1 and 12B2 illustrate an example resizing of a 3D volume using fixed extents.

FIGS. 14B1 and 14B2 illustrate an example page rotation.

DETAILED DESCRIPTION

A. Introduction

Virtual and augmented reality environments are generated by computers using, in part, data that describes the environment. This data may describe, for example, various objects with which a user may sense and interact with. Examples of these objects include objects that are rendered and displayed for a user to see, audio that is played for a user to hear, and tactile (or haptic) feedback for a user to feel. Users may sense and interact with the virtual and augmented reality environments through a variety of visual, auditory, and tactile means.

Virtual or augmented reality (AR) systems may be useful for many applications, spanning the fields of scientific visualization, medicine and military training, engineering design and prototyping, tele-manipulation and tele-presence, and personal entertainment. Augmented reality, in contrast to virtual reality, comprises one or more virtual objects in relation to real objects of the physical world. Such an experience greatly enhances the user's experience and enjoyability with the augmented reality system, and also opens the door for a variety of applications that allow the user to experience real objects and virtual objects simultaneously.

However, there are significant challenges in providing such a system. To provide a realistic augmented reality experience to users, the AR system should always know the user's physical surroundings in order to correctly correlate a location of virtual objects in relation to real objects. Further, the AR system should correctly know how to position virtual objects in relation to the user's head, body etc. This requires extensive knowledge of the user's position in relation to the world at all times. Additionally, these functions advantageously should be performed in a manner such that costs (e.g., energy costs, etc.) are kept low while speed and performance are maintained.

There, thus, is a need for improved systems to provide a realistic augmented reality experience to users.

B. Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

Figure 1:
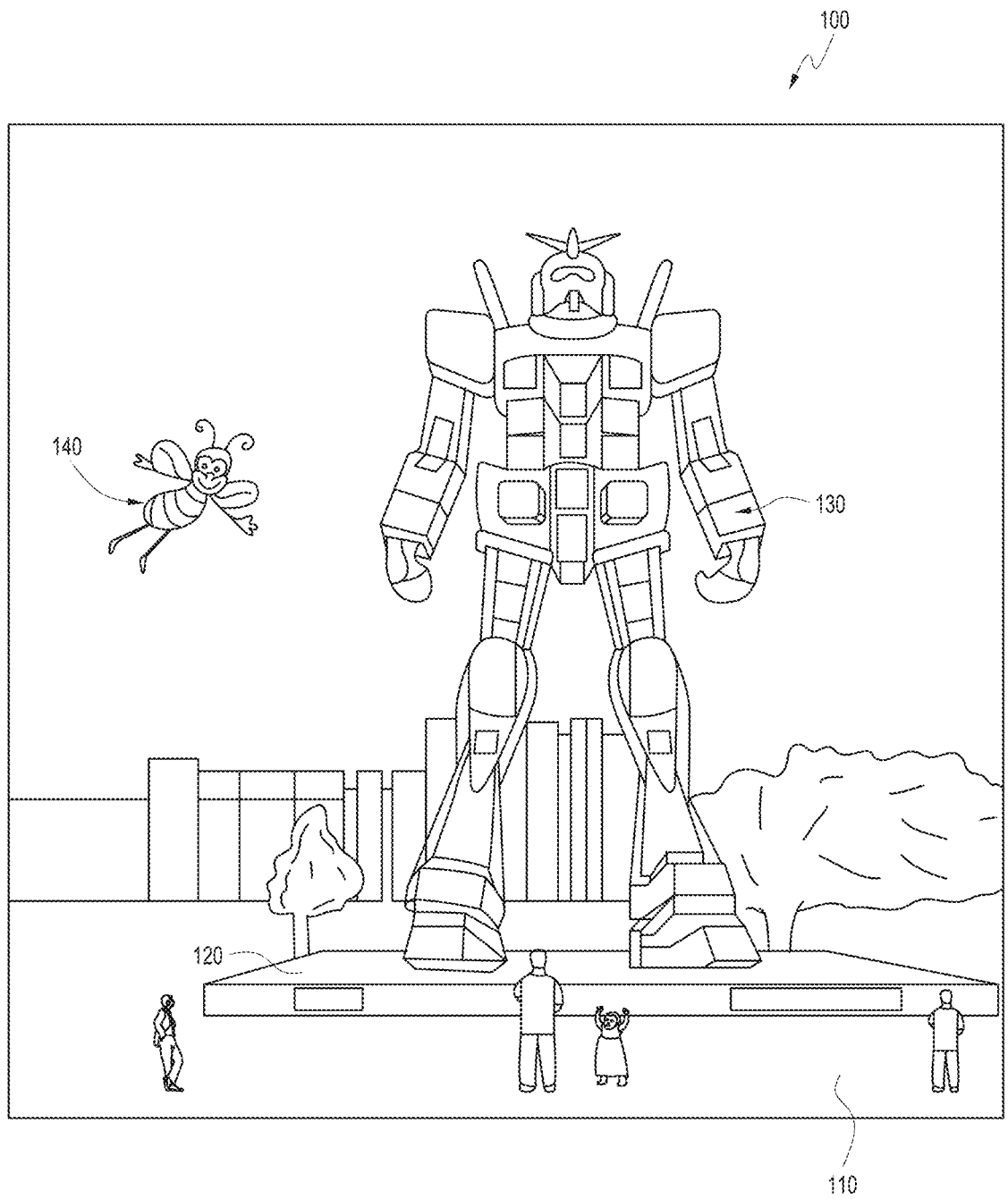
FIG. 1 depicts an illustration of a mixed reality scenario with certain virtual reality objects, and certain physical objects viewed by a person.

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
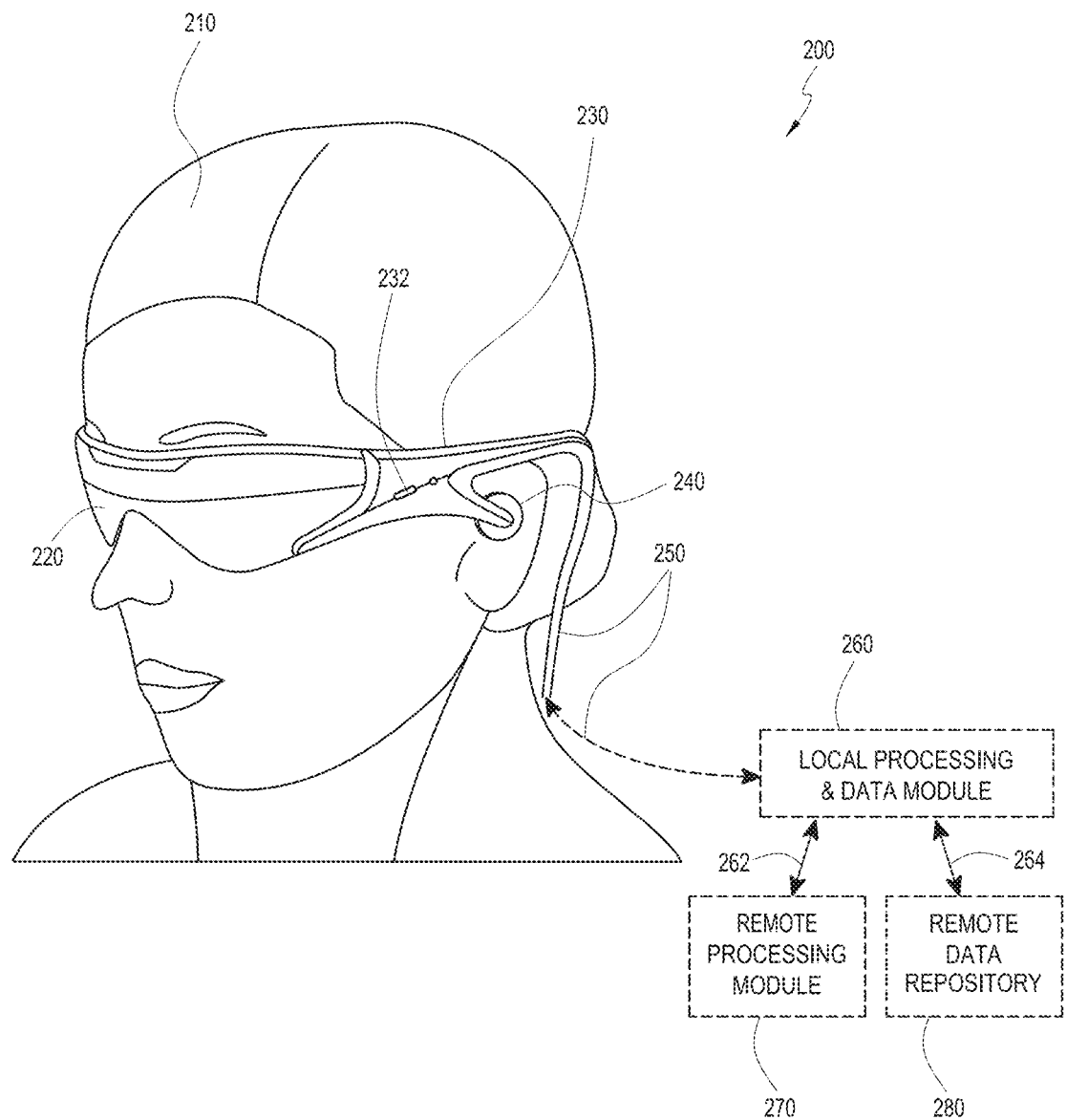
FIG. 2 schematically illustrates an example of a wearable system which can implement an example waypoint system.

FIG. 2 illustrates an example of wearable system 200 which can be configured to provide an AR/VR/MR scene and can include an example waypoint system described herein. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. One or more other audio sensors, not shown, can be positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 270 and remote data repository 280 may be operatively coupled to each other.

The remote processing module 270 can include one or more processors configured to analyze and process data or image information. The remote data repository 280 can include a digital data storage facility, which may be available through the internet or other networking configuration in a "cloud" resource configuration. Data can be stored, and computations can be performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
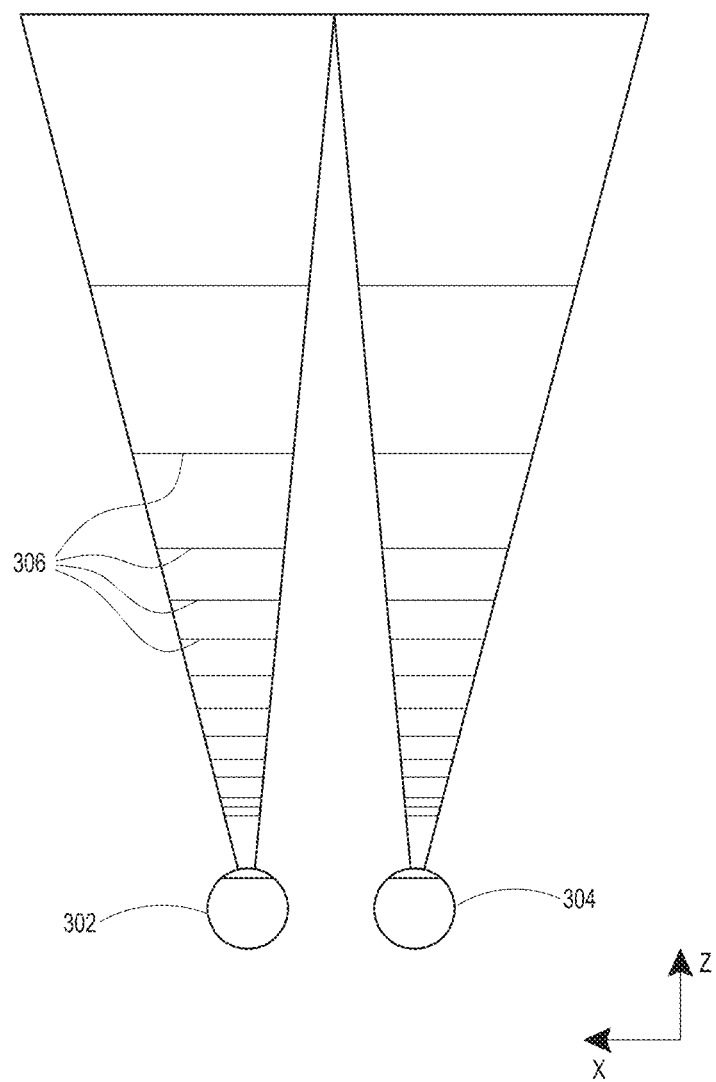
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. Three-dimensional imagery can be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

C. Waveguide Stack Assembly

Figure 4:
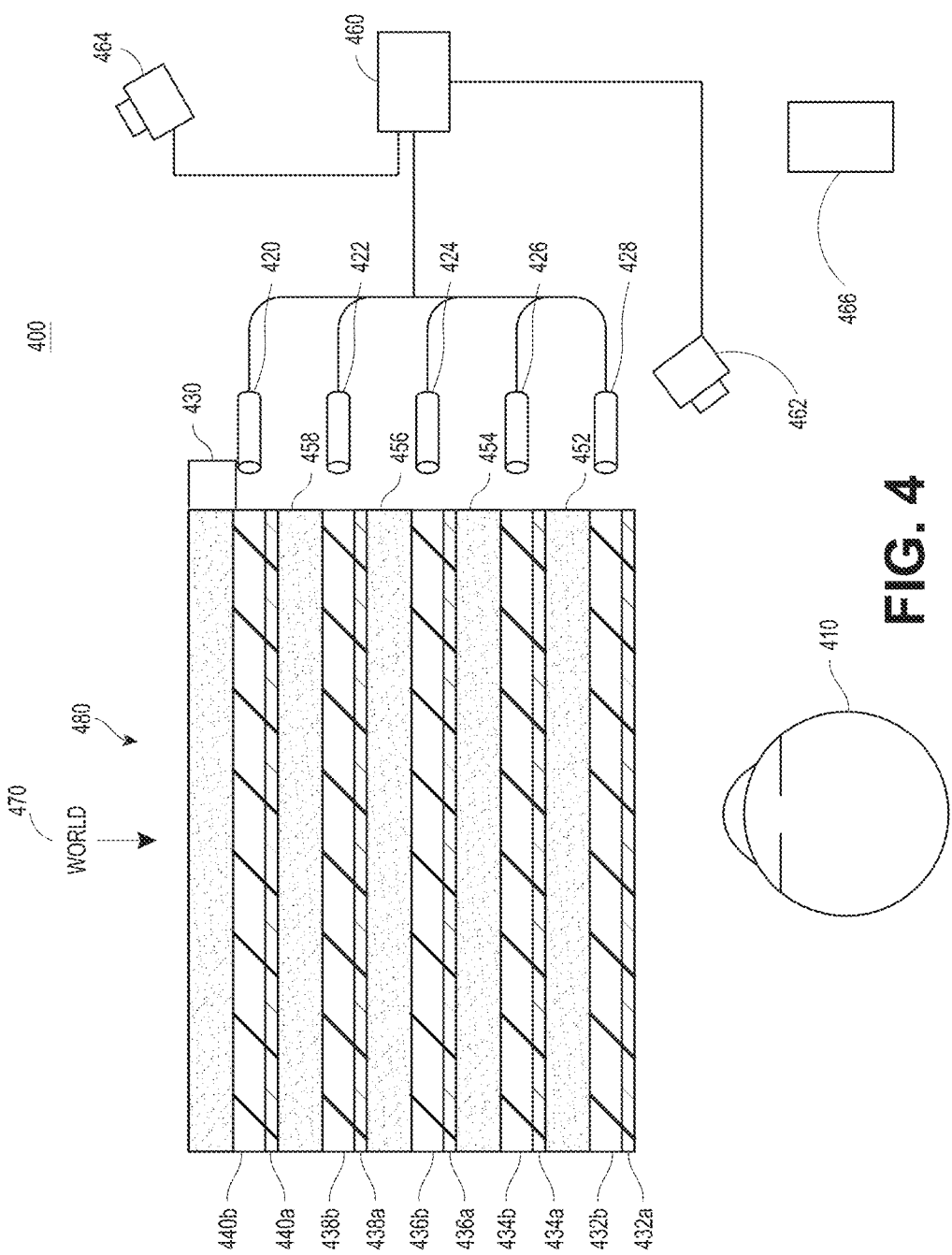
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. The wearable system 400 can correspond to wearable system 200 of FIG. 2, with FIG. 4 schematically showing some parts of that wearable system 200 in greater detail. For example, the waveguide assembly 480 can be integrated into the display 220 of FIG. 2.

With continued reference to FIG. 4, the waveguide assembly 480 may also include a plurality of features 458, 456, 454, 452 between the waveguides. The features 458, 456, 454, 452 may be lenses. The features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. A single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

The image injection devices 420, 422, 424, 426, 428 can be discrete displays that each produce image information for injection into a corresponding waveguide 440b, 438b, 436b, 434b, 432b, respectively. Additionally or alternatively, the image injection devices 420, 422, 424, 426, 428 can be the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 can include programming (e.g., instructions in a non-transitory computer-readable medium) that regulates the timing and provision of image information to the waveguides 440b, 438b, 436b, 434b, 432b. The controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light can be outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity the light extracting optical elements 440a, 438a, 436a, 434a, 432a may be disposed at the top or bottom major surfaces, or may be disposed directly in the volume of the waveguides 440b, 438b, 436b, 434b, 432b. The light extracting optical elements 440a, 438a, 436a, 434a, 432a may be formed in a layer of material that is attached to a transparent substrate to form the waveguides 440b, 438b, 436b, 434b, 432b. The waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b can be configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic, or electro-active). Additionally, or alternatively, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. As discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

One or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

The number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

The display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

It may be desirable to have an exit beam meet the condition of having a diameter that is less than the diameter of the eye of a viewer. However, meeting this condition may be challenging in view of the variability in size of the viewer's pupils. This condition may be met over a wide range of pupil sizes by varying the size of the exit beam in response to determinations of the size of the viewer's pupil. For example, as the pupil size decreases, the size of the exit beam may also decrease. The exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size or orientation of the pupil of the eye 304.

The inward-facing imaging system 466 can be used to obtain images for use in determining the direction the user is looking (e.g., eye pose) or for biometric identification of the user (e.g., via iris identification). At least one camera may be utilized for each eye, to separately determine the pupil size or eye pose of each eye independently, thereby allowing the presentation of image information to each eye to be dynamically tailored to that eye. The pupil diameter or orientation of only a single eye 410 (e.g., using only a single camera per pair of eyes) can be determined and assumed to be similar for both eyes of the user. The images obtained by the inward-facing imaging system 466 may be analyzed to determine the user's eye pose or mood, which can be used by the wearable system 400 to decide which audio or visual content should be presented to the user. Additionally, or alternatively, the wearable system 400 may determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. The user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
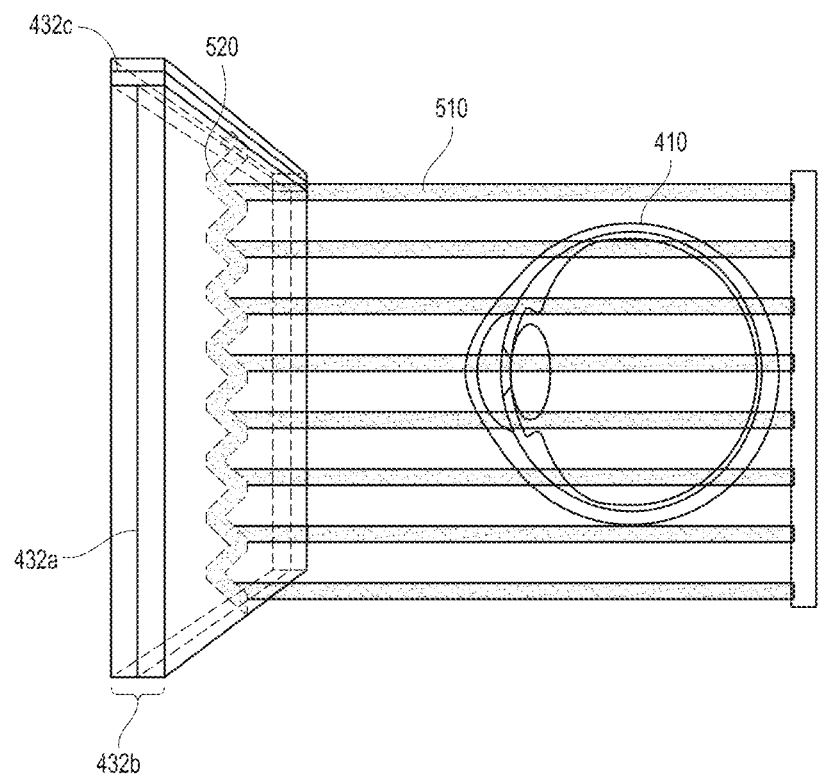
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 can be injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
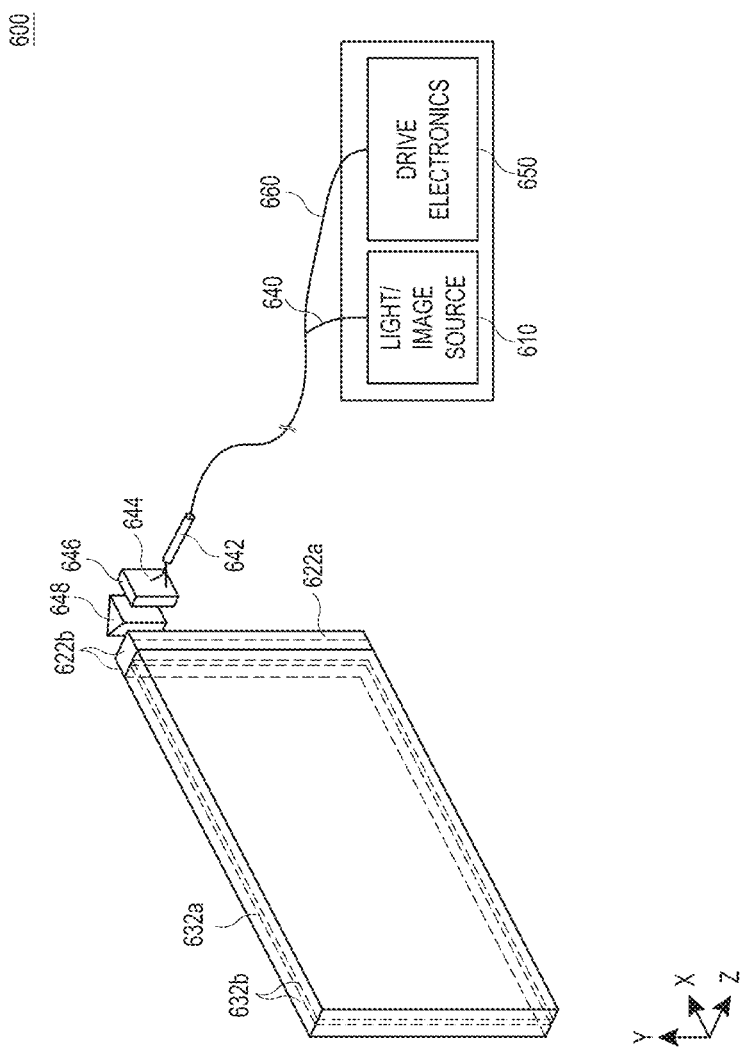
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6) and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar to or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery, or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR and emerge from the face of the primary waveguide 632b. The radially symmetric diffraction pattern of the DOE 632a additionally can impart a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue, and green light at a first focal depth. A second set of three adjacent layers may be employed to respectively produce red, blue, and green light at a second focal depth. Multiple sets may be employed to generate a full 3D or 4D color image light field with various focal depths.

D. Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

E. Web Page Deconstruction

With virtual reality, augmented reality, and/or mixed reality systems (hereinafter collectively referred to as "mixed reality" systems), a three dimensional environment is provided for the display of content to a user. Conventional approaches to display 2D content within browsers do not work very well when used in a 3D environment. One reason for this is because, with conventional 2D web browsers, the display area of the display device is limited to the screen area of a monitor that is displaying the content. As a result, conventional browsers are configured to only know how to organize and display content within that monitor display area. In contrast, 3D environments are not limited to the strict confines of the monitor display area. Therefore, conventional 2D browsers perform sub-optimally when used in a 3D environment since conventional browsing technologies do not have the functionality or capability to take advantage of the 3D environment for displaying content.

For example, consider the situation when a user is using mixed reality equipment and has placed multiple browser windows that are associated with different physical locations. For instance, the user may have opened a first browser window in a first room and a second browser window while in a second room. Since conventional 2D-based browsers are limited to the display of a given monitor area, this means that conventional browsers do not even have technology to comprehend the idea of physically remote windows, much less the ability to handle this situation with multiple windows open in multiple physical locations, making it impossible for a user to effectively view, navigate to, and use these multiple windows.

Therefore, there is a need for an improved approach to implement browsing technology in a 3D environment.

Implementations of the disclosure deconstruct a 2D web page to be displayed in a spatially organized 3D environment. The 2D web page may originate on a web browser of a head-mounted system, a mobile device (e.g., cell phone), a tablet, a television, an application, and the like. In some implementations, the 2D web page may be received from another application or device such as a laptop computer, a desktop computer, an email application with a link to the 2D web page, an electronic message referencing or including a link to the 2D web page and the like.

Figure 7:
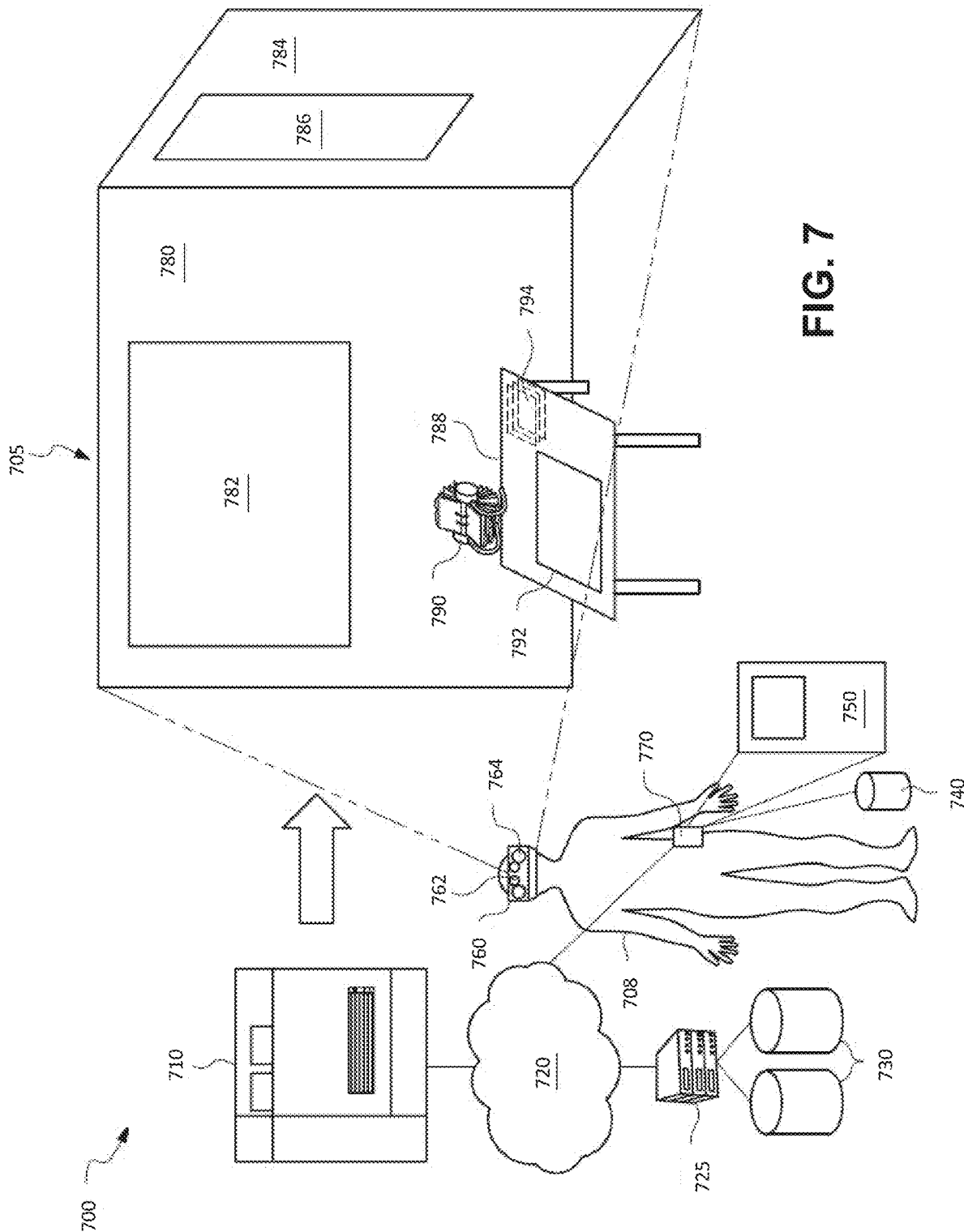
FIG. 7 illustrates an augmented reality environment for deconstructing 2D content to be displayed in a user's 3D environment, according to some implementations.

Referring to FIG. 7, environment 700 is representative of a physical environment and systems for implementing processes described below (e.g., deconstructing 2D content from a web page to be displayed on 3D surfaces in a user's physical environment 705 or providing authentication or authentication for applications or for providing modal browser windows). The representative physical environment and system of the environment 100 includes a user's physical environment 705 as viewed by a user 708 through a head-mounted system 760. The representative system of the environment 100 further includes accessing a 2D content (e.g., a web page) via a web browser 710 operably coupled to a network 720. The network 720 may be the Internet, an internal network, a private cloud network, a public cloud network, etc. The web browser 710 is also operably coupled to a processor 770 via the network 720. Although the processor 770 is shown as an isolated component separate from the head-mounted system 760, in an alternate implementation, the processor 770 may be integrated with one or more components of the head-mounted system 760, and/or may be integrated into other system components within the environment 100 such as, for example, the network 720 to access a computing network 725 and storage devices 730. The processor 770 may be configured with software 750 for receiving and processing information such as video, audio and content received from the head-mounted system 760, a local storage device 740, the web browser 710, the computing network 725, and the storage devices 730. The software 750 may communicate with the computing network 725 and the storage devices 730 via the network 720. The software 750 may be installed on the processor 770 or, in another implementation; the features and functionalities of software may be integrated into the processor 770. The processor 770 may also be configured with the local storage device 740 for storing information used by the processor 770 for quick access without relying on information stored remotely on an external storage device from a vicinity of the user 708. In other implementations, the processor 770 may be integrated within the head-mounted system 760.

The user's physical environment 705 is the physical surroundings of the user 708 as the user moves about and views the user's physical environment 705 through the head-mounted system 760. For example, referring to FIG. 7, the user's physical environment 705 shows a room with two walls (e.g., main wall 780 and side wall 784, the main wall and side wall being relative to the user's view) and a table 788. On the main wall 780, there is a rectangular surface 782 depicted by a solid black line to show a physical surface with a physical border (e.g., a painting hanging or attached to a wall or a window, etc.) that may be a candidate surface to project certain 2D content onto. On the side wall 784, there is a second rectangular surface 786 depicted by a solid black line to show a physical surface with a physical border (e.g., a painting hanging or attached to a wall or a window, etc.). On the table 788, there may be different objects. 1) A virtual Rolodex 790 where certain 2D content may be stored and displayed; 2) a horizontal surface 792 depicted by a solid black line to represent a physical surface with a physical border to project certain 2D content onto; and 3) multiple stacks of virtual square surfaces 794 depicted by a dotted black line to represent, for example, stacked virtual newspaper where certain 2D content may be stored and displayed.

The web browser 710 may also display a blog page from the internet or within an intranet or private network. Additionally, the web browser 710 may also be any technology that displays digital 2D content. 2D content may include, for example, web pages, blogs, digital pictures, videos, news articles, newsletters, or music. The 2D content may be stored in the storage devices 730 that are accessible by the user 708 via the network 720. In some implementations, 2D content may also be streaming content, for example, live video feeds or live audio feeds. The storage devices 730 may include, for example, a database, a file system, a persistent memory device, a flash drive, a cache, etc. In some implementations, the web browser 710 containing 2D content (e.g., web page) is displayed via computing network 725.

The computing network 725 accesses the storage devices 730 to retrieve and store 2D content for displaying in a web page on the web browser 710. In some implementations, the local storage device 740 may provide 2D content of interest to the user 708. The local storage device 740 may include, for example, a flash drive, a cache, a hard drive, a database, a file system, etc. Information stored in the local storage device 740 may include recently accessed 2D content or recently displayed content in a 3D space. The local storage device 740 allows improvements in performance to the systems of the environment 100 by providing certain content locally to the software 750 for helping to deconstruct 2D content to display the 2D content on the 3D space environment (e.g., 3D surfaces in the user's physical environment 705).

The software 750 includes software programs stored within a non-transitory computer readable medium to perform the functions of deconstructing 2D content to be displayed within the user's physical environment 705. The software 750 may run on the processor 770 wherein the processor 770 may be locally attached to the user 708, or in some other implementations, the software 750 and the processor 770 may be included within the head-mounted system 760. In some implementations, portions of the features and functions of the software 750 may be stored and executed on the computing network 725 remote from the user 708. For example, in some implementations, deconstructing 2D content may take place on the computing network 725 and the results of the deconstructions may be stored within the storage devices 730, wherein the inventorying of a user's local environment's surfaces for presenting the deconstructed 2D content on may take place within the processor 770 wherein the inventory of surfaces and mappings are stored within the local storage device 740. In one implementation, the processes of deconstructing 2D content, inventorying local surfaces, mapping the elements of the 2D content to local surfaces and displaying the elements of the 2D content may all take place locally within the processor 770 and the software 750.

The head-mounted system 760 may be a virtual reality (VR) or augmented reality (AR) head-mounted system that includes a user interface, a user-sensing system, an environment sensing system, and a processor (all not shown). The head-mounted system 760 presents to the user 708 an interface for interacting with and experiencing a digital world. Such interaction may involve the user and the digital world, one or more other users interfacing the environment 100, and objects within the digital and physical world.

The user interface may include receiving 2D content and selecting elements within the 2D content by user input through the user interface. The user interface may be at least one or a combination of a haptics interface devices, a keyboard, a mouse, a joystick, a motion capture controller, an optical tracking device and an audio input device. A haptics interface device is a device that allows a human to interact with a computer through bodily sensations and movements. Haptics refers to a type of human-computer interaction technology that encompasses tactile feedback or other bodily sensations to perform actions or processes on a computing device. In some implementations, the control interface may be a user interface, such that the user may interact with the MR display system, for example by providing a user input to the system and the system responding by executing a corresponding command.

The user-sensing system may include one or more sensors 762 operable to detect certain features, characteristics, or information related to the user 708 wearing the head-mounted system 760. For example, in some implementations, the sensors 762 may include a camera or optical detection/scanning circuitry capable of detecting real-time optical characteristics/measurements of the user 708 such as, for example, one or more of the following: pupil constriction/dilation, angular measurement/positioning of each pupil, spherocity, eye shape (as eye shape changes over time) and other anatomic data. This data may provide, or be used to calculate information (e.g., the user's visual focal point) that may be used by the head-mounted system 760 to enhance the user's viewing experience.

The environment-sensing system may include one or more sensors 764 for obtaining data from the user's physical environment 705. Objects or information detected by the sensors 764 may be provided as input to the head-mounted system 760. In some implementations, this input may represent user interaction with the virtual world. For example, a user (e.g., the user 708) viewing a virtual keyboard on a desk (e.g., the table 788) may gesture with their fingers as if the user was typing on the virtual keyboard. The motion of the fingers moving may be captured by the sensors 764 and provided to the head-mounted system 760 as input, wherein the input may be used to change the virtual world or create new virtual objects.

The sensors 764 may include, for example, a generally outward-facing camera or a scanner for interpreting scene information, for example, through continuously and/or intermittently projected infrared structured light. The environment-sensing system may be used for mapping one or more elements of the user's physical environment 705 around the user 708 by detecting and registering the local environment, including static objects, dynamic objects, people, gestures and various lighting, atmospheric and acoustic conditions. Thus, in some implementations, the environment-sensing system may include image-based 3D reconstruction software embedded in a local computing system (e.g., the processor 770) and operable to digitally reconstruct one or more objects or information detected by the sensors 764.

In one example implementation, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors. It should be appreciated that the environment-sensing system may include other components other than those discussed above.

As mentioned above, the processor 770 may, in some implementations, be integrated with other components of the head-mounted system 760, integrated with other components of system of the environment 100, or may be an isolated device (wearable or separate from the user 708) as shown in FIG. 7. The processor 770 may be connected to various components of the head-mounted system 760 through a physical, wired connection, or through a wireless connection such as, for example, mobile network connections (including cellular telephone and data networks), Wi-Fi, Bluetooth, or any other wireless connection protocol. The processor 770 may include a memory module, integrated and/or additional graphics processing unit, wireless and/or wired internet connectivity, and codec and/or firmware capable of transforming data from a source (e.g., the computing network 725, and the user-sensing system and the environment-sensing system from the head-mounted system 760) into image and audio data, wherein the images/video and audio may be presented to the user 708 via the user interface (not shown).

The processor 770 handles data processing for the various components of the head-mounted system 760 as well as data exchange between the head-mounted system 760 and 2D content from web pages displayed or accessed by web browser 710 and the computing network 725. For example, the processor 770 may be used to buffer and process data streaming between the user 708 and the computing network 725, thereby enabling a smooth, continuous and high fidelity user experience.

Deconstructing 2D content from a web page into elements and mapping the elements to be displayed on surfaces in a 3D environment may be accomplished in an intelligent and logical manner. A predetermined set of rules may be available to recommend, suggest, or dictate where to place certain types of elements/content identified within a 2D content/web page. For example, certain types of 2D content elements may have one or more content elements that may need to be mapped to a physical or virtual object surface amenable for storing and displaying the one or more elements while other types of 2D content elements may be a single object, such as a main video or main article within a web page, in which case, the single object may be mapped to a surface that makes the most sense to display a single object to the user.

Figure 8:
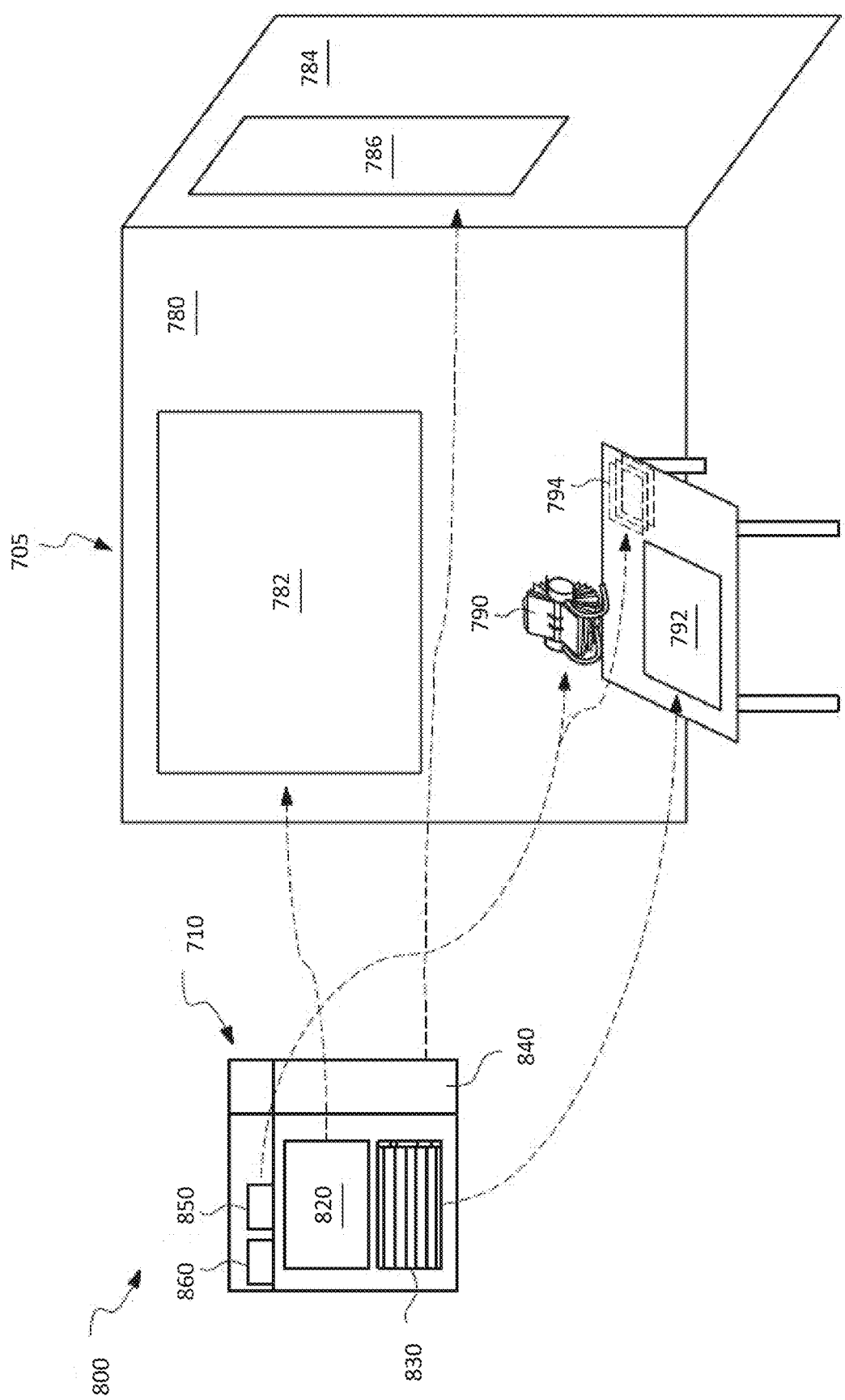
FIG. 8 illustrates an example mapping of elements of a 2D content to a user's 3D environment, according to some implementations.

FIG. 8 illustrates an example mapping of elements of a 2D content to a user's 3D environment, according to some implementations. Environment 800 depicts a 2D content (e.g., a web page) displayed or accessed by a web browser 710 and a user's physical environment 705. The dotted lines with an arrowhead depict elements (e.g., particular types of content) from the 2D content (e.g., web page) that are mapped to and displayed upon the user's physical environment 705. Certain elements from the 2D content are mapped to certain physical or virtual objects in the user's physical environment 705 based on either web designer hints or pre-defined browser rules.

As an example, 2D content accessed or displayed by the web browser 710 may be a web page having multiple tabs, wherein a current active tab 860 is displayed and a secondary tab 850 is currently hidden until selected upon to display on the web browser 710. Displayed within the active tab 860 is typically a web page. In this particular example, the active tab 860 is displaying a YOUTUBE page including a main video 820, user comments 230, and suggested videos 840. As depicted in this example FIG. 8, the main video 820 may be mapped to display on vertical surface 782, the user comments 230 may be mapped to display on horizontal surface 792, and suggested videos 840 may be mapped to display on a different vertical surface 786 from the vertical surface 782. Additionally, the secondary tab 850 may be mapped to display on a virtual Rolodex 790 and/or on a multi-stack virtual object 794. In some implementations, specific content within the secondary tab 850 may be stored in the multi-stack virtual object 794. In other implementations, the entire content residing within the secondary tab 850 may be stored and/or displayed on the multi-stack virtual object 794. Likewise, the virtual Rolodex 790 may contain specific content from the secondary tab 850 or the virtual Rolodex 790 may contain the entire content residing within the secondary tab 850.

The vertical surface 782 may be any type of structure which may already be on a main wall 780 of a room (depicted as the user's physical environment 705) such as a window pane or a picture frame. In some implementations, the vertical surface 782 may be an empty wall where the head-mounted system 760 determines an optimal size of the frame of the vertical surface 782 that is appropriate for the user 708 to view the main video 820. This determination of the size of the vertical surface 782 may be based at least in part on the distance the user 708 is from the main wall 780, the size and dimension of the main video 820, the quality of the main video 820, the amount of uncovered wall space, and/or the pose of the user when looking at the main wall 780. For instance, if the quality of the main video 820 is of high definition, the size of the vertical surface 782 may be larger because the quality of the main video 820 will not be adversely affected by the vertical surface 782. However, if the video quality of the main video 820 is of poor quality, having a large vertical surface 782 may greatly hamper the video quality, in which case, the methods and systems of the present disclosure may resize/redefine the vertical surface 782 to be smaller to minimize poor video quality from pixilation.

The vertical surface 786, like the vertical surface 782, is a vertical surface on an adjacent wall (e.g., side wall 784) in the user's physical environment 705. In some implementations, based on the orientation of the user 708, the side wall 784 and the vertical surface 786 may appear to be slanted surfaces on an incline. The slanted surfaces on an incline may be a type of orientation of surfaces in addition to vertical and horizontal surfaces. The suggested videos 840 from the YOUTUBE web page may be placed on the vertical surface 786 on the side wall 784 to allow the user 708 to be able to view suggested videos simply by moving the their head slightly to the right in this example.

The virtual Rolodex 790 is a virtual object created by the head-mounted system 760 and displayed to the user 708. The virtual Rolodex 790 may have the ability for the user 708 to bi-directionally cycle through a set of virtual pages. The virtual Rolodex 790 may contain entire web pages, or it may contain individual articles or videos or audios. As shown in this example, the virtual Rolodex 790 may contain a portion of the content from the secondary tab 850 or in some implementations, the virtual Rolodex 790 may contain the entire page of the secondary tab 850. The user 708 may bi-directionally cycle through content within the virtual Rolodex 790 by simply focusing on a particular tab within the virtual Rolodex 790 and the one or more sensors (e.g., the sensors 762) within the head-mounted system 760 detect the eye focus of the user 708 and cycle through the tabs within the virtual Rolodex 790 accordingly to obtain relevant information for the user 708. In some implementations, the user 708 may choose the relevant information from the virtual Rolodex 790 and instruct the head-mounted system 760 to display the relevant information onto either an available surrounding surface or on yet another virtual object such as a virtual display in close proximity to the user 708 (not shown).

The multi-stack virtual object 794, similar to virtual Rolodex 790, may contain content ranging from full contents from one or more tabs or particular contents from various web pages or tabs that the user 708 bookmarks, saves for future viewing, or has open (e.g., inactive tabs). The multi-stack virtual object 794 is also similar to a real-world stack of newspapers. Each stack within the multi-stack virtual object 794 may pertain to a particular newspaper article, page, magazine issue, recipe, etc. One of ordinary skill in the art may appreciate that there can be multiple types of virtual objects to accomplish this same purpose of providing a surface to place 2D content elements or content from a 2D content source.

One of ordinary skill in the art may appreciate that 2D content accessed or displayed by the web browser 710 may be more than just a web page. In some implementations, 2D content may be pictures from a photo album, videos from movies, TV shows, YOUTUBE videos, interactive forms, etc. Yet in other implementations, 2D content may be e-books, or any electronic means of displaying a book. Finally, in other implementations, 2D content may be other types of content not yet described because 2D content is generally how information is presented currently. If an electronic device can consume a 2D content, then the 2D content can be used by the head-mounted system 760 to deconstruct and display the 2D content in a 3D setting (e.g., AR).

In some implementations, mapping the accessed 2D content may include extracting the 2D content (e.g., from the browser) and putting it on a surface (such that the content is no longer in the browser and only on the surface), and in some implementations, the mapping can include replicating content (e.g., from the browser) and putting it on a surface (such that the content is both in the browser and on the surface).

F. Web Content in a Bounded Volume

Figure 9A:
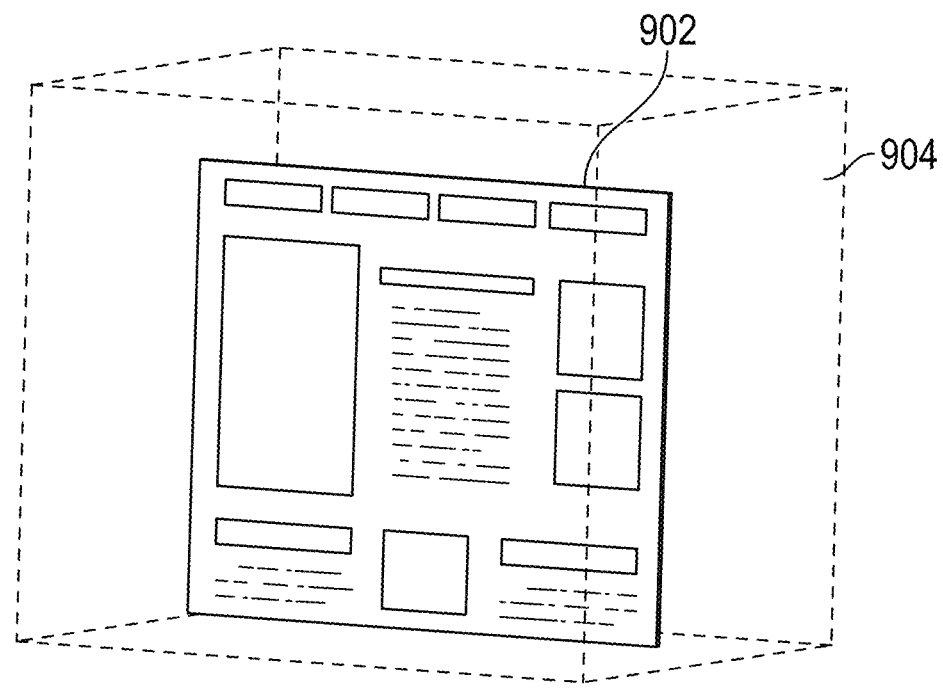
FIG. 9A illustrates an example browser tile displayed in a bounded volume of 3D space.

In some implementations, extracted web content can be placed within a bounded volume within the user's 3D spatial environment. Advantageously, restricting placement of content to within a bounded volume can allow a user to have better control of placement of content within their environment. In some examples, content can be placed in reference to a volume around a browser tile that may be part of a web browser application. FIG. 9A illustrates an example browser tile 902 in a volume 904 of 3D space.

A browser tile 902 can display 2D content, such as some or all of a web page, content associated with a web domain, or non-web based textual or graphical information. For example, the browser tile 902 can include a graphical interface for accessing content, such as graphics or text. The browser tile 902 can include one or more aspects of a web browser, such as a multiple window or tab functionality, back and forward interactive features for navigating content a user has previously interacted with, a refresh interactive feature to refresh currently viewed content, a cancel interactive feature to cancel loading of content, a home interactive feature to return to preset content, a navigation feature to input local or web locations of content, or a search feature to search for local or web-based content. In some examples, a browser tile 902 can include the 2D content displayed in conjunction with one or more aspects of the web browser, such as those described above.

The AR system may allow the user to interact with the browser tile 902 and/or content displayed in the browser tile 902. For example, the AR system may receive an indication to move or manipulate the browser tile 902 through a user pose, gesture, or actuation of a user input device. The AR system may respond by correspondingly moving or manipulating the browser tile 902. In some examples, relevant user poses for moving or manipulating the browser tile 902 can include hand motions, body positioning, the like or some combination thereof. In another example, the AR system may receive an indication to manipulate the content displayed in the browser tile 902 or other content associated with the browser tile 902 through a user pose or actuation of a user input device. The AR system may respond by correspondingly manipulating the content associated with a browser tile by, for example, scrolling through content, clicking through to seek new content, selecting content, deleting content, extracting content, inputting content, the like, or some combination thereof. The manipulation can include interacting with one or more browser features that may be included in the browser tile 902. For example, the manipulation can include seeking content by inputting information into an address or search feature, loading or aborting loading of content, or other manipulations as a result of interacting with other interactive features.

An AR system may display a browser tile 902 in a volume 904 of 3D space. The volume 904 may include a subset of the 3D environment of the user. As described below, the volume 904 may be static or manipulatable. For example, the volume 904 may be expanded, reduced, or otherwise transformed via a user indication and/or automatically by the AR system.

Figure 9B:
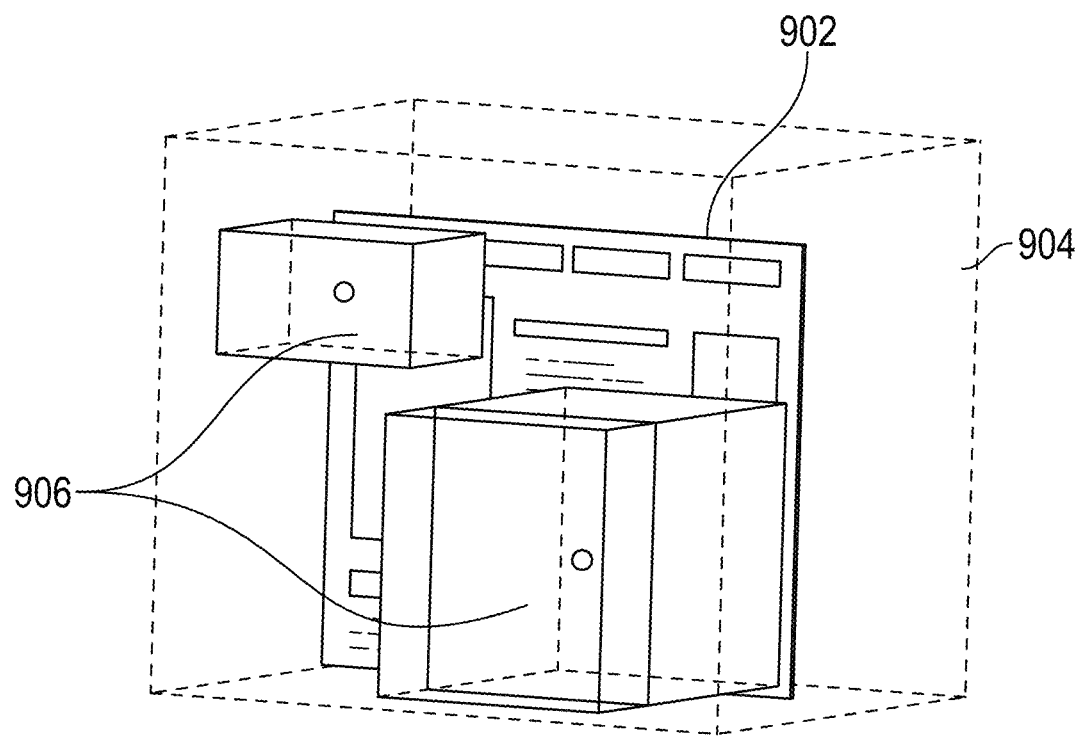
FIG. 9B illustrates an example browser tile with 3D web content in a bounded volume of 3D space.

The AR system may display 3D content 906 associated with the 2D content displayed in the browser tile 902. FIG. 9B illustrates an example browser tile 902 with 3D content 906 in the volume 904. 3D content 906 can include one or more virtual objects.

In some embodiments, 3D content may include one or more prisms, which generally describes a container, area, or volume associated with mixed reality content, which may contain multiple virtual content items, such as representations of 3D objects. Content bounded in the prism may be controlled or placed in the user's environment by controlling or placing the prism in which the content is bounded. A virtual object, as used herein, may be or include a prism. Various characteristics, uses, and implementations of prisms are described in U.S. Patent Publication No. 2019/0197785, published Jun. 27, 2019, which is hereby incorporated by reference herein in its entirety.

Virtual objects can be associated with 2D content displayed in the browser tile 902. For example, 2D content can be a website for a furniture company and the virtual objects can be 3D virtual representations of furniture described on the website. In some examples, the virtual objects can be displayed near the browser tile 902, such as at locations in the 3D volume 904 associated with locations of graphics displayed on the browser tile 902. For example, 2D content can include a 2D representation of a couch. 3D content can include a 3D representation of the couch. In some examples, the AR system may display the 3D representation of the couch in front of or instead of the 2D representation of the couch, such as a representation of the couch (or other 3D content) extending out of the browser tile 902.

Placement and size of virtual objects may vary or be modified by the user. For example, an AR system may place the virtual object(s) based on a default location within the volume 904 relative to the browser tile 902. In some examples, an AR system may apply a transform to one or more virtual objects, such as a rotation, scaling, movement, more complex animation, the like or some combination thereof.

Figure 10A:
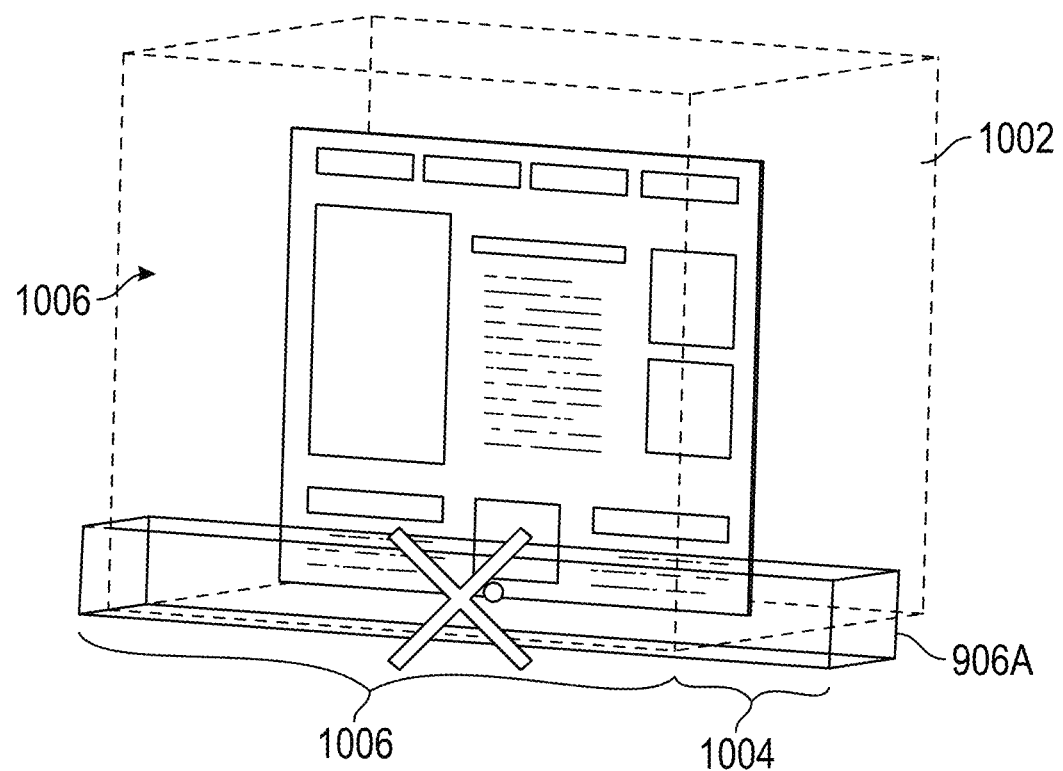
FIG. 10A illustrates an example situation where 3D web content is larger than a bounded volume of 3D space.
Figure 10B:
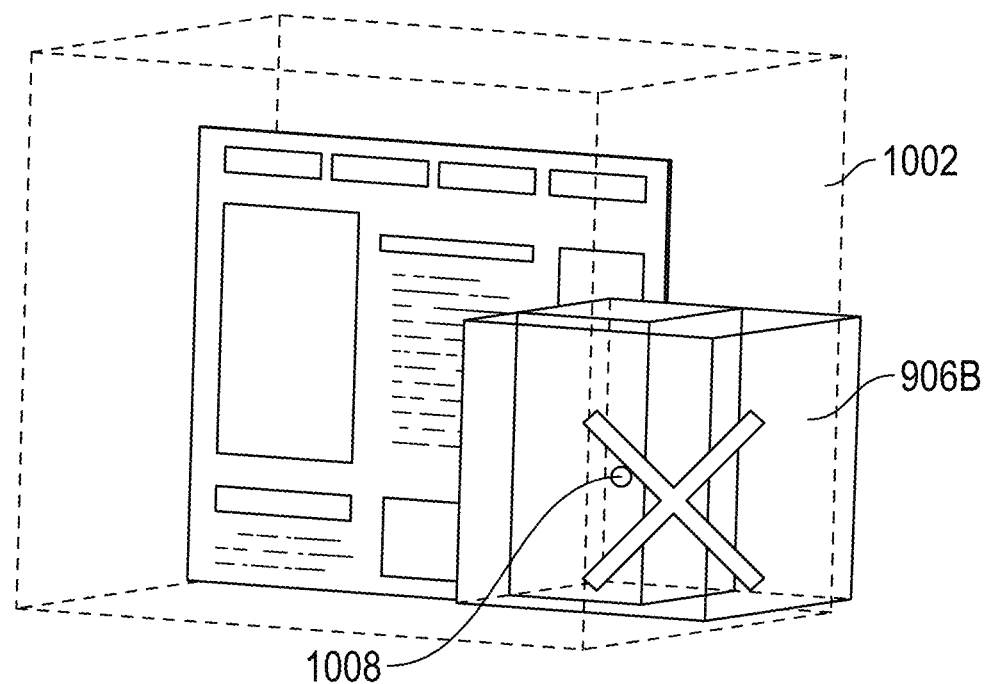
FIG. 10B illustrates an example situation where a center of 3D web content does not intersect with the fixed volume of 3D space.

As illustrated in FIGS. 10A and 10B, display of a virtual object may be restricted to the bounds of a 3D volume 1002. For example, the AR system may receive instructions, such as by a user or executable instructions to display a portion of a virtual object 906 outside the bounds of the volume 1002. The AR system may determine not to display the virtual object 906 or display a portion of the virtual object 906. Additionally or alternatively, as discussed below, the AR system can resize or reorient the 3D volume 1002 so as to encompass the virtual object 906, e.g., by adjusting position, volume, orientation, and/or location of the virtual object 906.

In one example, as illustrated in FIG. 10A, a virtual object 906A can be placed, sized, or oriented such that a portion 1004 of the virtual object 906 falls outside the bounds of the 3D volume 1002. If the portion 1004 exceeds a threshold volume or a threshold percentage of the 3D volume 1002 or virtual object 906A or other threshold associated with the virtual object 906A or 3D volume 1002, the AR system may determine not to display the entirety of the virtual object 906A. If the portion 1004 falls below the threshold, the AR system may determine to display the virtual object 906A in whole or in part. For example, the AR system may display the portion 1006 of the virtual object 906 that falls within the 3D volume 1002. In another example, the AR system may display the entire virtual object 906A, even if it falls outside the 3D volume 1002.

In another example, as illustrated in FIG. 10B, a virtual object 906B can be placed, sized, and/or oriented such that a center 1008 of the virtual object 906B falls outside the 3D volume 1002. If the center 1008 of the virtual object 906 falls outside the 3D volume 1002, the AR system may determine not to display the entirety of the virtual object 906B. In another example, the AR system may determine to display a portion of the virtual object 906B that falls within the 3D volume 1002.

G. Example Bounded Volume

Figure 11:
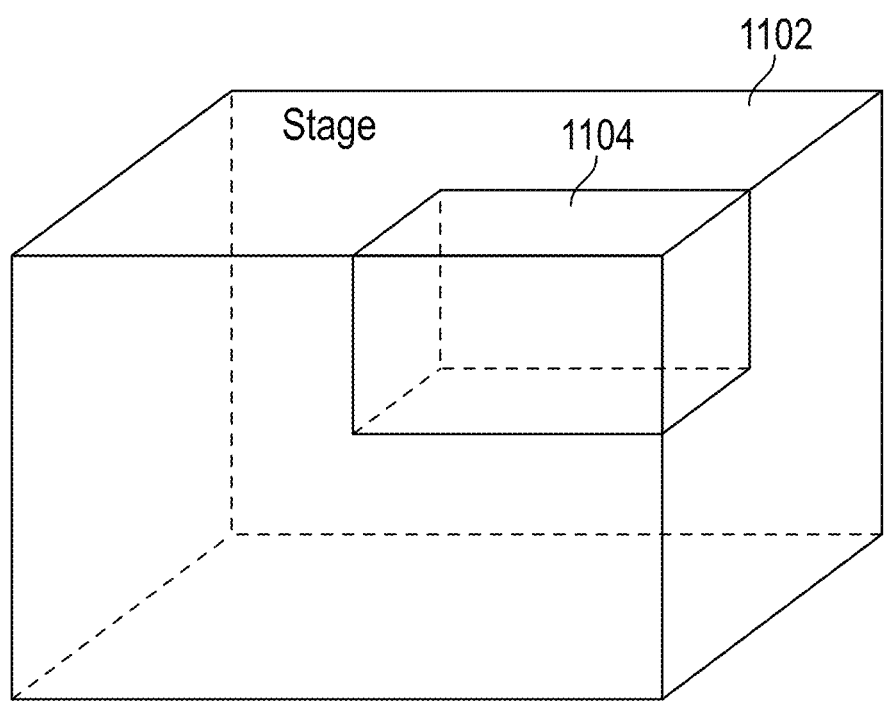
FIG. 11 illustrates an example content stage or volume.

In some examples, an AR system may define a 3D volume of space (also referred to as a stage) in the user's environment. As illustrated in FIG. 11, a 3D volume 1102 can include an area of space in which content 1104 can be created, displayed, or manipulated In some examples, the volume 1102 may have a default size or shape. The default size may be set to a predetermined size, may be set relative to the size of content 1104, may be set relative to the user's environment or field of view, or may be set based on another factor.

For example, the default size may be a cuboid having sides of 0.75 meters, 0.8 meters, 0.86 meters, 1 meters or other size. In another example, the default size may be a cuboid having sides of 1000 pixels, 1100 pixels, 1120 pixels, 1200 pixels or other size. Advantageously, setting the default size based on a set of predetermined dimensions can allow for larger content without having to resize the volume 1102.

In another example, the default size may be a percentage larger than the content 1104 in at least one dimension. For example, the volume 1102 may be 20% wider and 20% taller than the content 1104 and the depth (or breadth) of the volume 904 may be equivalent to the width of the volume 1102. In another example, the volume 1102 may be 10% wider and the same height as the content 1104. In another example, the volume 1102 may be 50% wider and 100% taller than the content 1104. However, other examples are also possible. Advantageously, setting the default size based on a size of the content 1104 can allow for smaller and more focused placement of new content related to the content 1104. For example, the content 1104 can be a browser tile that allows for access to a web domain. The web domain may request placement of new content. Defining the default size relative to the size of the web domain can allow the placement of small content related to the web domain near the browser tile.

In some examples, the default size may be relative to the field of view of the user such that the volume 1102 fills a percentage of the user's Field of View (FOV). For example, the volume 1102 may be 10%, 25%, 50%, 100%, 150% or other percentage amount of the FOV.

The shape of the volume 1102 can be any 3D shape, such as a cube, cuboid, sphere, spheroid, pyramid, cylinder, some combination thereof, the like, or other shape. In some examples, the shape of the volume 1102 may be a complementary shape to the content 1104. For example, the content 1104 may be a browser tile having a cuboid shape. The volume 1102 may then have a cuboid shape. In another example, the content 1104 may be a more complex geometric shape, such as a couch or person. The volume 1102 may be a shape outlining the geometric shape of the content 1104. Additionally, or alternatively, the volume 1102 may be a spherical or cuboid shape with dimensions to encompass the content 1104.

In some examples the volume 1102 may have default dimensions based on one or more properties of the content 1104. For example, the content 1104 may be a browser tile. The volume 1102 may have dimensions relatively close to the browser tile because the browser tile is not designed to move without user input. In another example, the content 1104 may be a virtual object (e.g., a butterfly) configured to fly around the user's environment. The volume 1102 may have dimensions that encompass a large percentage of the user's FOV in order to allow the content 1104 to move around.

In some examples, the volume may be a static volume. In other examples, the volume may be manipulatable or changeable. As illustrated in FIGS. 12A1 and 12A2, a volume 1203 may expand to encompass one or more pieces of content 1204, 1206. FIG. 12A1 illustrates a perspective view 1200 and FIG. 12A2 illustrates a top down view 1201 of a volume 1202 which may be changeable. For example, an initial size of the volume 1203 may be a default size relative to a browser tile. The user may interact with a web domain using the browser tile 1204. The web domain may request the AR system to display or otherwise cause the AR system to display related content 1206 within the environment of the user. As a result, the AR system may expand the volume 1203 in one or more directions to reach (e.g. become) the volume 1202B that encompasses the related content 1206 and display the content 1206, as shown in FIG. 12A2.

The volume may be expanded or resized using defined extents. FIGS. 12B1 and 12B2 illustrates an example expansion using extents. An extent can include a defined amount of distance from a piece of content, such as a browser tile. In some examples, if a piece of content is resized, the one or more extents around a piece of content can remain the same while the volume around the content is resized. For example, the AR system may define a number of pixels in one or more dimensions to add to the volume around the content 1224 (shown as 1224A in FIGS. 12B1 and 1224B in FIG. 12B2) in the user's environment. In some examples, the extent can include 100 pixels to the left, 100 pixels to the right, 150 pixels to the bottom, 250 pixels to the left, and/or 200 pixels to the front. However, other combinations of dimensions or extents are possible. The extents may be defined by the requesting party, the user, or the AR system.

In another example, the AR system may define a percentage change of one or more dimensions of a volume. For example, the AR system may increase a width by 20% to the left, 10% to the bottom, and 50% to the top or other combination of dimensions or percentages. In the example illustrated in FIGS. 12B1 and 12B2, the AR system utilized a set of defined extents 1222 to expand the volume 1205A to a volume 1205B. For example, a defined extent 1222 may be a number of pixels, such as 100 pixels. The AR system may initially size the volume 1205A corresponding to a volume of content 1224A plus the extents on one or more sides of the volume of content 1224A. After a resize of the volume of content 1224A to a volume of content 1224B, the AR system may keep the same extents and expand to the volume 1205B, which includes the volume of the content 1224B plus the extents on one or more sides of the volume of content 1224B. In some examples, the content can include a browser tile and the resize can correspond to a resize of the browser tile or web page associated with the browser tile.

As discussed below, the AR system may control the dimensions of the volume 1205A based on one or more of user inputs and third party requests or other factors. For example, in order to prevent third parties, such as web domains, from automatically expanding the volume 1205A in displaying new content, the AR system may determine a status of a set of permissions, which may include user input. Advantageously, this process can allow a user or AR system to exert better control over the use of the space within the user's environment, but still allow third parties to recommend optimized sizing for the content or volume.

H. Example Resizing Authentication Process

Figure 13A:
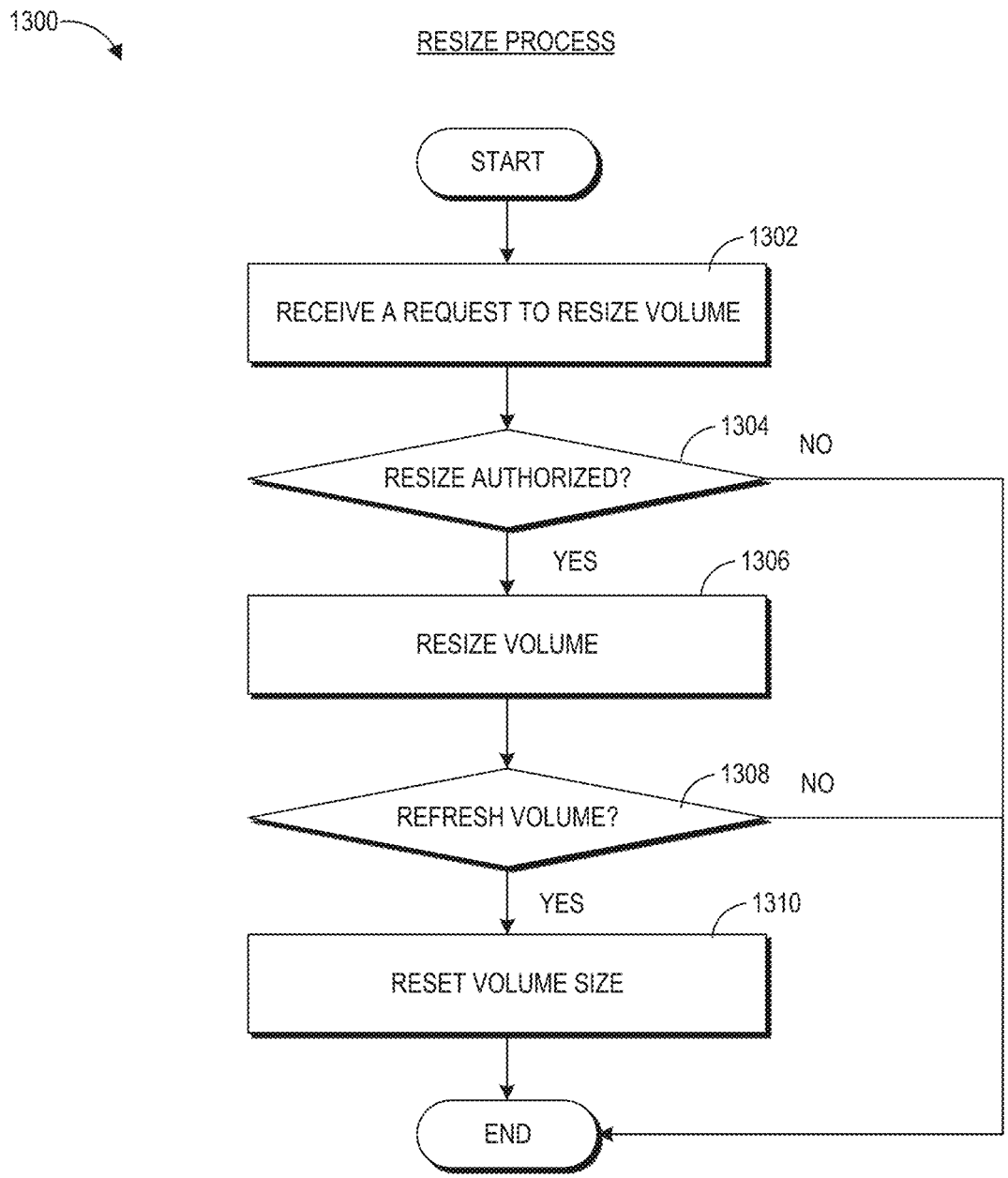
FIG. 13A is a flow chart of an example volume resizing process.
Figure 13B:
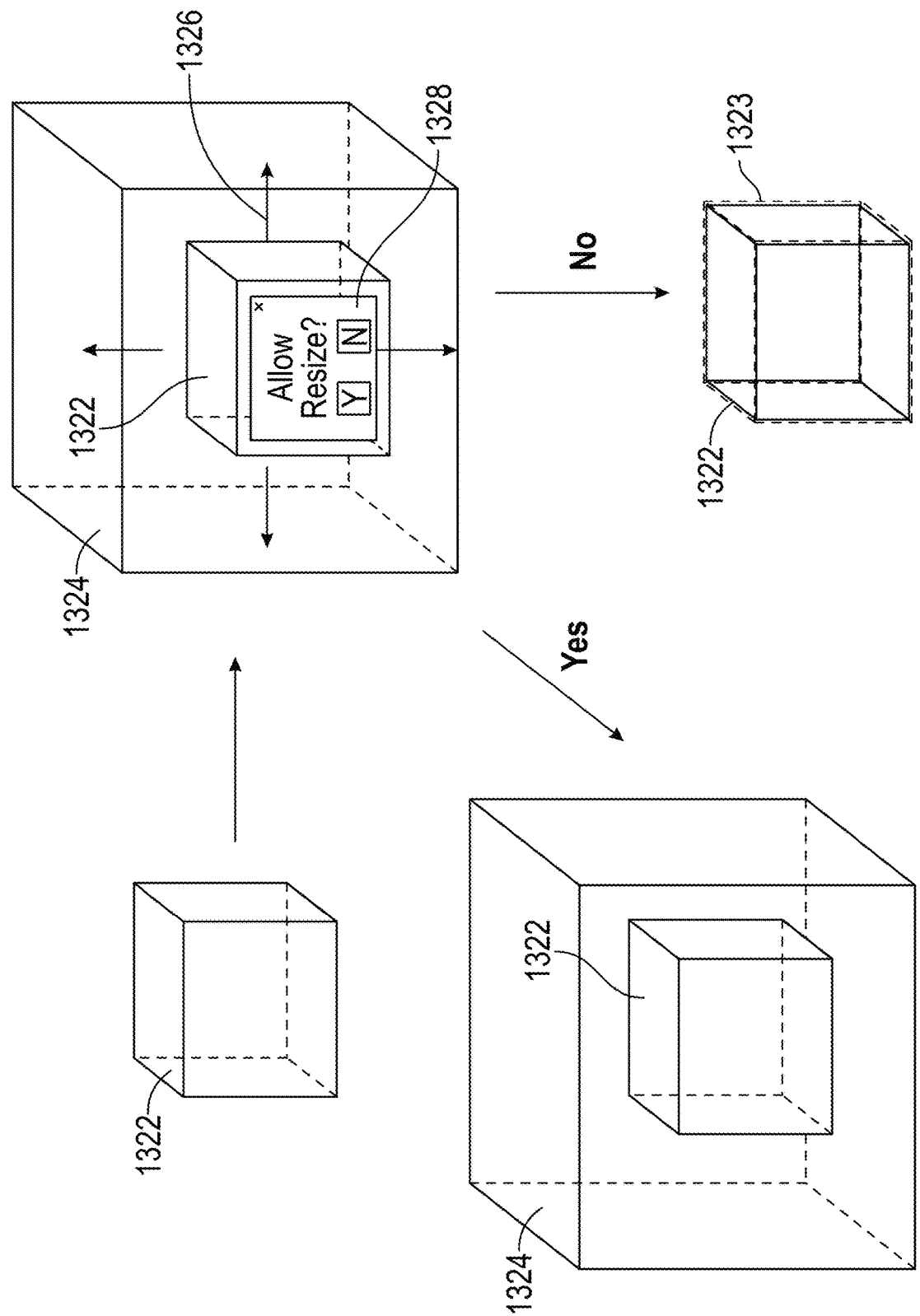
FIG. 13B illustrates an example volume resizing.

In some examples, an AR system may control the resizing of a volume through an authentication process. FIG. 13A is a flowchart illustrating an example resizing process 1300 that may include an authentication process. FIG. 13B shows a set of example steps that may be a part or the result of one or more steps in resizing process 1300.

In reference to FIG. 13A, at a block 1302, the AR system may receive a resize request. The resize request can include a request from an application, web domain, third party, or other source to resize a volume 1324, such as shown in FIG. 13B. Resizing the volume 1324 can include expanding or contracting the volume 1324 in one or more directions from a point within the volume 1324, such as a center of the volume 1324, a center of content 1322 within the volume 1324, or another point within the 3D environment of the user. The resize request can include a percentage or amount of change in one or more dimensions of the volume 1324. For example, the change amount can include an amount in meters, a number of pixels, or other amount. In some examples, the change amount can be based on a size or placement of added content within the volume 1324. For example, the user may interact with a web domain via a browser application displayed within the volume 1324. The web domain may request to display 3D content within the 3D environment of the user based on the user interaction. The web domain may send a resize request (or the AR system may automatically initiate a resize request based on the web domain content, for example) based on the desired size and placement of the 3D content within the volume 1324 such that the 3D volume 1324 encompasses the added content.

At a block 1304, the AR system may determine whether the resize is authorized. For example, the AR system may determine whether the user authorizes or has authorized a change in size of the volume 1324 to the size requested. The AR system may make this determination by displaying a prompt to the user, checking an authorization status of the request, checking an authorization status of the requestor, by some combination thereof, or by another method.

To determine an authorization by displaying a prompt to the user, the AR system may graphically display a graphic or text requesting user input with regard to the resize request. For example, as shown in FIG. 13B, an AR system may output a graphic 1328 to request permission for resizing a volume 1324. The graphic 1328 can include text and/or one or more interactive components for user input. For example, the graphic 1328 can include a prompt to the user regarding whether to allow a resize of the stage. Additionally, or alternatively, the graphic 1328 can include one or more buttons, such as a yes button or a no button, or other interactive components for accepting user input. The AR system may additionally or alternatively display one or more temporary lines 1326 to illustrate a proposed new size of the volume 1324. The one or more temporary lines 1326 may include arrows, lines, or other indications of distance. The lines 1326 may begin at the current bounds of the content 1322 (or at the current bounds of the prism that contains the content) or current bounds of the stage 1324 and extend to the new proposed bounds of the stage 1324. In some examples, the lines may be removed once a user input is received. Additionally or alternatively to the temporary lines, the AR system may display the proposed bounds of the volume 1324 by, for example, displaying an outline of the proposed bounds of the volume 1324, or shading the added volume of the proposed size of the volume 1324. If the resize is authorized, by for example, a user acceptance of a resize request, the AR system may resize the stage 1324. If the resize is not authorized, the AR system may not resize the stage. For example, the AR system may display a stage 1323 of the same or similar volume as content 1322.

To determine an authorization by checking an authorization status of the request, the AR system may determine whether the user has previously authorized a resize. For example, the user may authorize all resize requests or some resize requests during a particular interaction session. For example, during a web session, a user may have authorized a volume expansion of 100 pixels in each of six directions. However, the AR system may have expanded the volume by 25 pixels in each of the six directions when placing content. The AR system may then determine whether the current resize request falls within the bounds of the originally authorized 100 pixels in each of the six directions. If the resize falls within the previously authorized limits, then the AR system may resize the stage at block 1306. If the AR system finds that the resize was not within the limits, the AR system may deny the resize or display a prompt to the user to authorize the resize. Additionally, or alternatively, the AR system may determine an authorization status by checking if the resize falls within a threshold change (e.g., a default threshold change or a user-defined threshold change). If the threshold change falls below a threshold amount, the AR system may authorize the resize. If the threshold change exceeds the threshold change, the AR system may deny the resize or display a prompt to the user to authorize the resize.

To determine an authorization by checking an authorization status of the requestor, the AR system may determine if the user has allowed the requestor to resize the volume 1324 in general, during a limited period of time, and/or within certain bounds. For example, the requestor can be a trusted requestor such that the AR system will approve all resize requests. In another example, the requestor can have limited authorization such that the AR system will approve resize requests within set limits with respect to time, volume change, and/or other parameter. For example, if the user has authorized the requestor, such as a web domain, to resize the volume 1324 during a web session, the AR system may resize the volume during the web session. However, if the user navigates away from the web domain, the AR system may not resize the volume or prompt the user to authorize the resize.

At a block 1306, the AR system may resize the stage. The resize can include one or more processes, such as those described with respect to FIGS. 12A and 12B. With reference to FIG. 13B, the AR system can resize the volume 1324 using percentage changes, with extents, or another method. In some examples, the AR system may not display an outline of the volume 1324 upon resize. In some examples, the AR system may display an outline of the volume 1324 upon resize.

At a block 1308, the AR system may determine whether to refresh the stage. The AR system may determine that a stage should be refreshed based on one or more refresh conditions. A refresh condition can include one or more states of the content, source of the content (such as a web domain or application), AR system, resize authorization, or other related condition. For example, the AR system may determine whether a resize authorization has ended or whether the resize is no longer relevant, such as when a user is no longer interacting with content from a requestor. In some examples, a refresh may occur when a user moves away from a web domain that requested a resize. For example, a user may switch from a shopping site that requested a resize to display products in the user's environment to a news website. In another example, a refresh may occur when a web session has ended, or a new web session has started. In another example, a refresh may occur upon starting or restarting of an application. In another example, a size of a stage may depend on or be tied to the content or application the user is interacting with. If the user starts another application or loads content with its own stage size requirements, the AR system may refresh the stage. If the AR system determines that a refresh has occurred, then the AR system may reset the volume 1324 at block 1310. If the AR system has not determined that a refresh has occurred, the AR system may continue to use the current size of the volume 1324.

At a block 1310, the AR system may set the volume 1324 to a previous size. For example, the AR system can set the volume 1324 to a size in user by the AR system prior to the resize request. In some examples, the previous size can include the default size of the volume 1324, such as the size of a browser tile or other content plus some extents in one or more dimensions. In other examples, the previous size can include a size that is not the default size.

I. Example Page Rotation

Figure 14A:
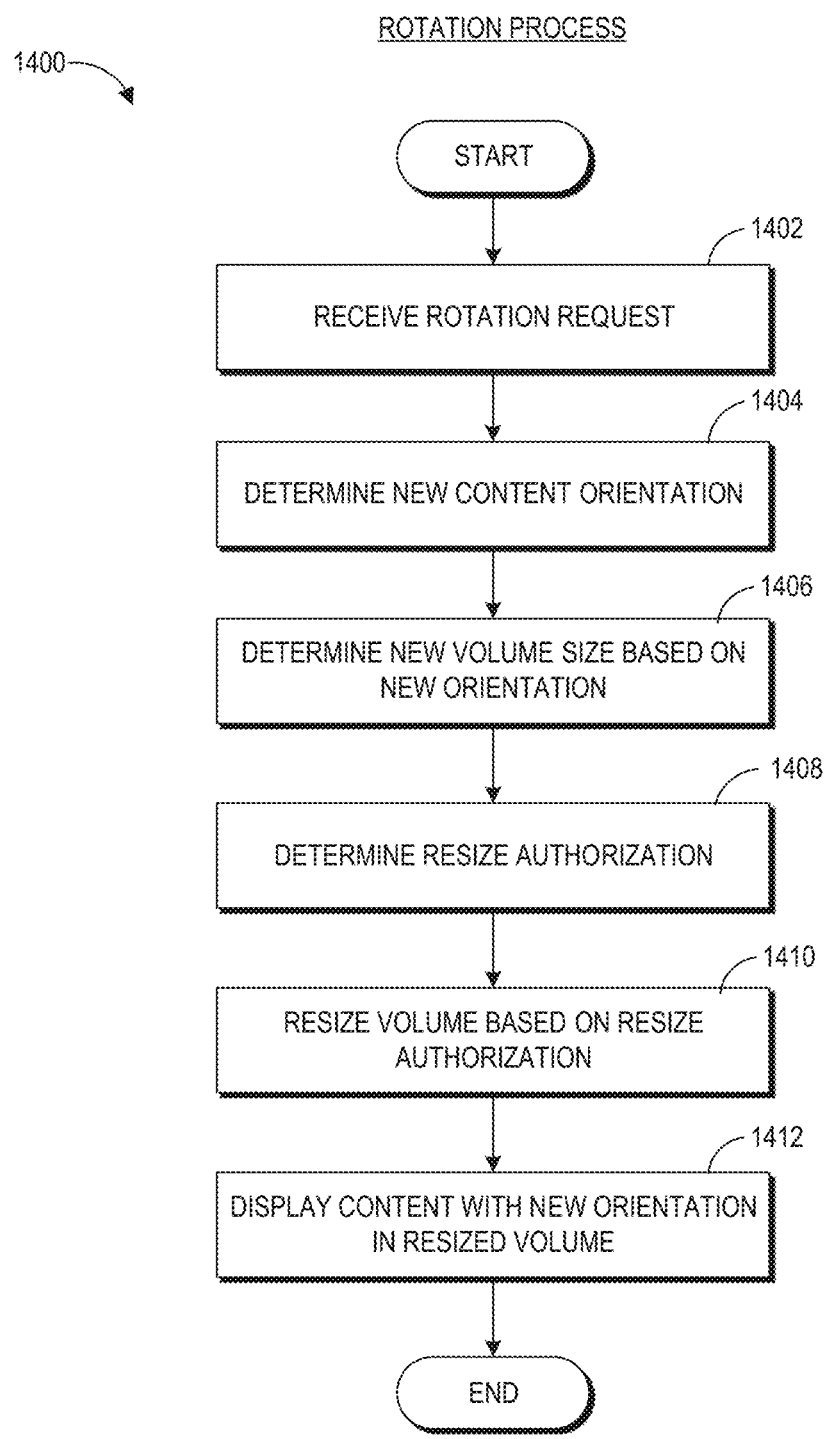
FIG. 14A is a flow chart of an example page rotation handling process.

In some examples, an AR system may resize a volume to accommodate content rotation, such as rotation of a web page within a browser tile. FIG. 14A illustrates an example rotation process 1400 for rotating a web page within a browser tile and FIG. 14B illustrates an example of a volume rotation resizing of a web page within a browser tile.

In reference to FIG. 14A, at a block 1402, an AR system may receive a rotation request. The rotation request can include a request from a user or third party application to rotate one or more components of content displayed in the 3D environment of the user. For example, as illustrated in FIG. 14B, an AR system may display a web page 1428 within a browser tile 1424. The web page may be displayed in a vertical orientation initially. A user, third party, or application may request the web page to be oriented in a horizontal orientation. In other examples, the AR system may display a plurality of content. The AR system may receive a request to reorient or relocate one or more pieces of that content within the 3D environment of the user.

With continued reference to FIG. 14A, at a block 1404, the AR system can determine a new orientation of content within the 3D environment of the user. For example, an AR system can identify a new orientation based on the pose of the user and/or the rotation request. Any number of orientations are possible. In some examples, the new orientation may be horizontal, vertical, diagonal, rotated around an x, y, or z axis, the like, or some combination thereof. For example, if the user is looking at content, such as a browser tile, the user may request the content within the browser tile orient so that the content is facing (e.g. perpendicular to) the direction of the user's gaze. In another example, as illustrated in FIG. 14B, content can be a web page 1428 within a browser tile 1424 and the user may request the web page 1428 reorient from vertical orientation 1401 to horizontal orientation 1403.

At a block 1406, the AR system can determine a new volume size based on the new orientation. For example, as illustrated in FIG. 14B1, an AR system can resize a volume 1422A to accommodate a page 1428 in a new orientation. The new volume 1422B can include the same, larger, or smaller lengths in one or more dimensions. For example, in the example shown in FIGS. 14B1 and 14B2, the height h, and width w of a volume may remain the same (e.g., in the volume 1422A and volume 1422B), but a depth d may be increased to the height of the page 1428 in volume 1422B. However, other resizing is also possible.

At a block 1408, the AR system can determine a resize authorization. The resize authorization can include one or more steps for determining whether the resize request is authorized by the user or AR system. For example, the resize authorization can include one or more steps of a resizing process 1300 described with reference to FIG. 13A. In some examples, the AR system may display a prompt to the user to determine whether a resize or orientation is authorized. If the AR system determines that the resize is authorized, the AR system may resize the volume in block 1410. If the resize is not authorized, the AR system may not resize the volume or not display the new content orientation.

At a block 1410, the AR system can resize the volume based on the resize authorization. The resize can include one or more processes, such as those described with respect to FIGS. 12A and 12B. As applied to FIG. 14B, for example, the AR system can resize the volume 1422 using percentage changes, with extents, or another method. In some examples, the AR system may not display an outline of the volume 1422A after the resize from volume 1422. In some examples, the AR system may display an outline of the volume 1422A upon resize from volume 1422, such as for a predetermined time period and/or until a particular user interaction occurs.

At a block 1412, the AR system can display the content in the resized volume at the new orientation. The content may be displayed at the requested orientation such that the position of the content falls within the resized volume 1422A.

J. Example Content Handling

Figure 15A:
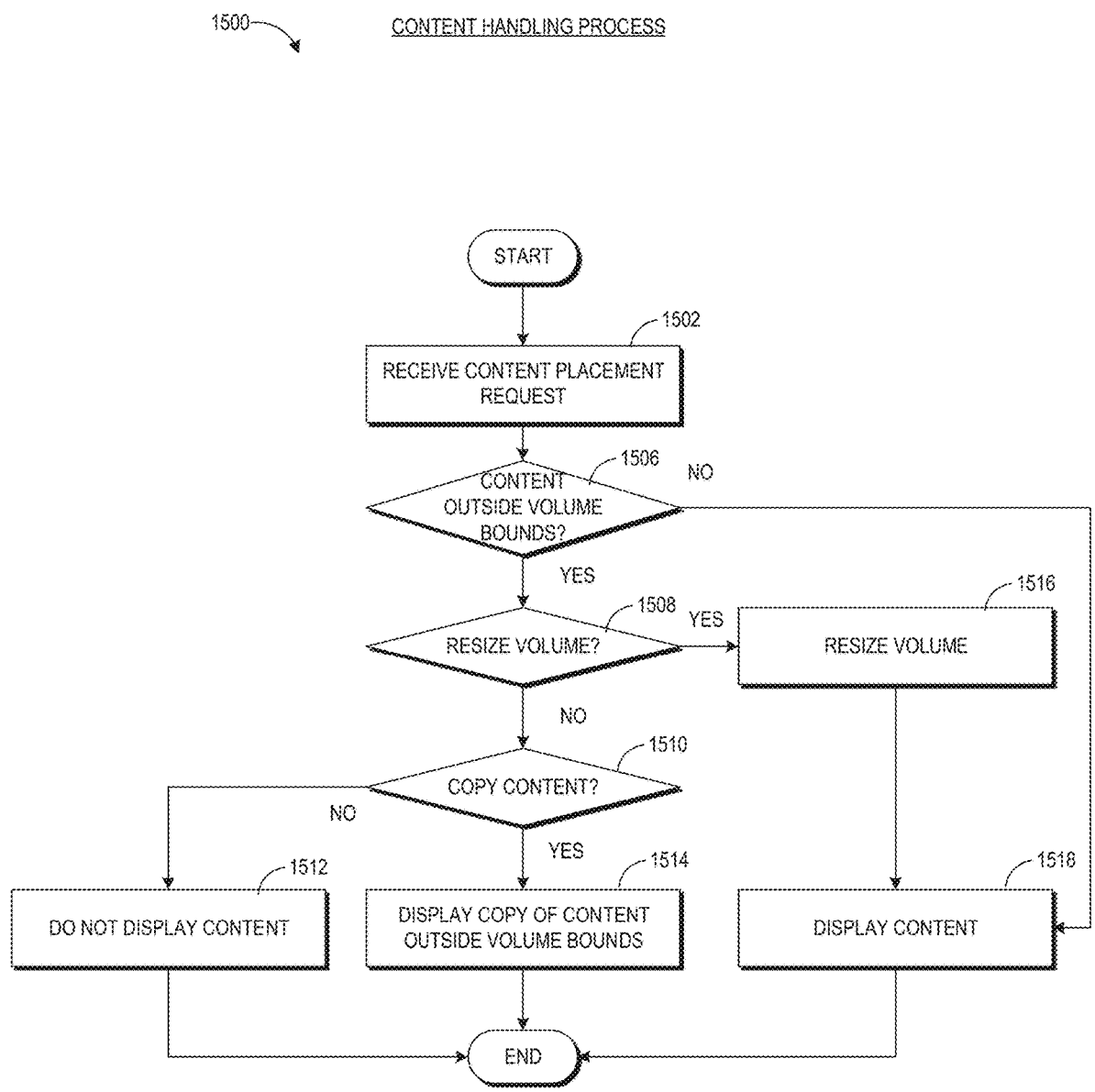
FIG. 15A is a flow chart of an example content handling process.
Figure 15B:
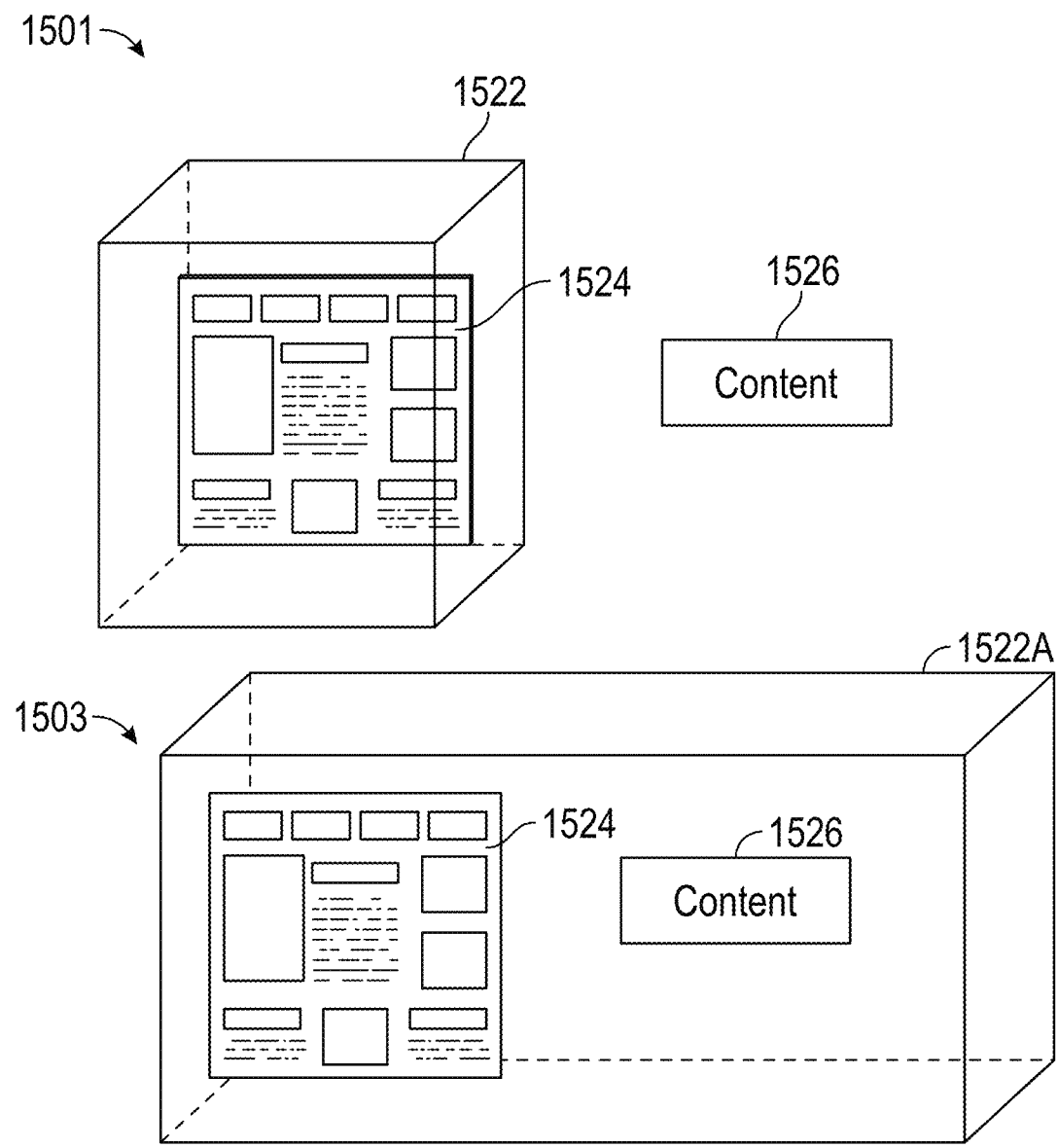
FIG. 15B illustrates two examples of content handling process.

In some examples, an AR system may receive a request to position or place content in a 3D environment of a user in which some or all of that content falls outside the bounds of the defined volume of space in which the content is allowed to be placed. FIG. 15A illustrates an example content handling process 1500 for placing such content and FIG. 15B illustrates an example of content handling when a volume is resized and when a volume is not resized.

With reference to FIG. 15A, at a block 1502, an AR system may receive a content placement request. The content placement request can include a request from an application, web domain, third party, or other source to place content 1526 in an area of the user's 3D environment, such as illustrated in FIG. 15B. The content placement request can include coordinates and/or dimensions of content 1526. The coordinates can be in reference to the volume 1522, the user, and/or another point of origin within the 3D environment of the user. In some examples, the request can include placement of some or all of the content 1526 outside of the volume 1522. In some examples, the request can include placement of some or all of the content 1526 inside of the volume 1522. For example, the user may interact with a web domain via a browser application displayed within the volume 1522. The web domain may request to display content 1524 within the volume 1522 based on the user interaction. Additionally, or alternatively, the web domain may send a content placement request based on the desired size and placement of the content 1524 within the volume 1522.

At a block 1506, the AR system may determine whether a portion of the content would fall outside the bounds of the volume based on the content placement request. For example, as illustrated in situation 1501 of FIG. 15B, the AR system may receive a request to place content 1526 entirely outside of the bounds of the volume 1522. However, other situations are possible.

In another example, the AR system may receive a request to place a portion of the content 1526 outside of the bounds of the volume 1522. In some examples, the AR system may determine that the content 1526 falls outside the bounds of the volume 1522 if the portion exceeds a threshold volume or a threshold percentage of the volume 1522 or other threshold associated with the content 1524, 1526, and/or 3D volume 1522. In some examples, the threshold can include 5% of the volume, 10% of the volume, or any other percentage. In some examples, the threshold can include 10 pixels, 15 pixels, or any other number of pixels. If the AR system determines that the content falls inside the volume bounds, the AR system may display the content within the volume at block 1518. If the AR system determines that the content falls outside the volume bounds, the AR system may determine whether to resize the volume at block 1508.

At a block 1508, the AR system may determine whether to resize the volume. For example, the AR system can determine whether to resize the content based on the status of a resize authorization. The resize authorization can include one or more steps for determining whether the resize request is authorized by the user or AR system. For example, the resize authorization can include one or more steps of a resizing process 1300 described with reference to FIG. 13A. In some examples, the AR system may display a prompt to the user to determine whether a resize or orientation is authorized. If the AR system determines that the resize is authorized, the AR system may resize the volume in block 1516. If the resize is not authorized, the AR system may determine whether to copy the content in block 1510.

At a block 1516, the AR system may resize the volume. The resize can include one or more processes, such as those described with respect to FIGS. 12A and 12B. With reference to FIG. 15B, for example, the AR system can resize the volume 1522 using percentage changes, with extents, or another method to expand to volume 1522A. In some examples, the AR system may not display an outline of the volume 1522A after resize from volume 1522. In some examples, the AR system may display an outline of the volume 1522A after resize from volume 1522. Once the AR system resizes the volume, the AR system may display the content in the resized volume 1522A at the requested position, as illustrated in FIG. 15B in situation 1503.

At a block 1510, the AR system may determine whether to copy the content. In order to determine whether the copy should be made and placed, the AR system may determine whether the user has authorized to display a copy of the content 1526 outside of the bounds of the volume 1522. The copy authorization can include one or more steps for determining whether a copy is authorized by the user or AR system. In some examples, the AR system may display a prompt to the user to determine whether copying and displaying the content 1526 outside the volume 1522 at the requested placement is authorized. If the user indicates approval of the copying in response to the prompt, the AR system may determine that copying is authorized and display a copy of the content outside the volume 1522 at block 1514. If the user indicates that the copying is not approved, the AR system may determine not to display a copy of the content at the requested placement location at block 1512.

A copy of the content can include a visual representation of the content 1526 that may or may not contain metadata associated with the originating requestor and may or may not allow the requestor to control one or more parameters associated with the copy. For example, the copy can include a visual representation of the content 1526 without allowing the party originating the content 1526, such as a web domain, to control the movement, animation, or other aspects of the representation. In another example, the copy can include a representation of the content 1526 that includes metadata connected to the requestor, such as a hyperlink, animation, or other data associated with the requestor.

At a block 1512, the AR system may hide or not display some or all of the content 1526, such as illustrated in situation 1501 of FIG. 15B. For example, the content 1526 can be placed sized, or oriented such that a center of the content 1526 falls outside the 3D volume 1522. If the center of the content 1526 falls outside the 3D volume 1522, the AR system may determine not to display the entirety of the content 1526. In another example, the AR system may determine to display a portion of the content 1526 that falls within the 3D volume 1522.

K. Additional Examples

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein.

Example 1: A display system for displaying virtual content in a three-dimensional (3D) spatial environment, the display system comprising: a head-mounted display configured to present virtual content to an eye of a user of the display system; and circuitry in communication with the head-mounted display, the circuitry configured to: receive a request to access 3D web based content; identify parameters associated with the 3D web based content comprising at least one of: a location in the 3D spatial environment of the user to display the 3D web based content, an orientation of the 3D content, or dimensions of the 3D content; determine whether the 3D content can be displayed in an authorized portion of the 3D spatial environment of the user based on the parameters; in response to determining that the 3D content cannot be displayed in the authorized portion of the 3D spatial environment, resize the authorized portion to allow display of the 3D content in the resized authorized portion.

Example 2: The display system of Example 1, wherein the circuitry is configured to: display a browser tile in the 3D spatial environment, wherein the authorized portion of the 3D spatial environment comprises: a width greater than the width of the browser tile; a height greater than the height of the browser tile; and a depth greater than the depth of the browser tile.

Example 3: The display system of any one of Examples 1 or 2, wherein the circuitry is configured to display the browser tile in the authorized portion.

Example 4: The display system of any one of Examples 1-3, wherein to determine whether the 3D content can be displayed in the authorized portion, the circuitry is configured to determine whether a threshold amount of the 3D content can be displayed within the authorized portion.

Example 5: The display system of any one of Examples 1-4, wherein the circuitry is configured to: in response to determining that the 3D content can be displayed in the authorized portion of the 3D spatial environment, display the 3D content in the authorized portion.

Example 6: The display system of any one of Examples 1-5, wherein to resize the authorized portion, the circuitry is configured to: determine a resize authorization status; and resize the authorized portion based on the resize authorization status.

Example 7: The display system of any one of Examples 1-6, wherein to determine a resize authorization status, the circuitry is configured to identify an authorization based on a user input.

Example 8: The display system of any one of Examples 1-7, wherein the 3D web based content is associated with a web domain and wherein to determine a resize authorization status, the circuitry is configured to identify an authorization based on whether the web domain is an authorized requestor.

Example 9: The display system of any one of Examples 1-8, wherein a resize authorization status comprises an authorization to resize the authorized portion during a current session of access to a web domain associated with the 3D web based content.

Example 10: The display system of any one of Examples 1-9, wherein to resize the authorized portion, the circuitry is configured to: increase the width of the authorized portion in at least one direction by a first amount; increase the height of the authorized portion in at least one direction by a second amount; and increase the depth of the authorized portion in at least one direction by a third amount.

Example 11: The display system of any one of Examples 1-10, wherein the circuitry is configured to: determine a refresh condition associated with the authorized portion; and set the size of the authorized portion to a default size.

Example 12: The display system of Example 11, wherein the refresh condition comprises at least one of: a user interaction with a web domain not associated with the 3D web based content and an indication from the user to cease display of the 3D web based content.

Example 13: A display system for displaying virtual content in a three-dimensional (3D) spatial environment, the display system comprising:
a head-mounted display configured to present virtual content to an eye of a user of the display system; and circuitry in communication with the head-mounted display, the circuitry configured to: receive a request to access content; display the content in an authorized portion of the 3D spatial environment of the user in a first orientation; receive a request to display the content in the 3D spatial environment of the user in a second orientation; determine whether the content can be displayed in the authorized portion of the 3D spatial environment of the user in the second orientation; and in response to determining that the content cannot be displayed in the authorized portion of the 3D spatial environment in the second orientation, resize the authorized portion to allow display of the content in the second orientation within the resized authorized portion.

Example 14: The display system of Example 13, wherein the content comprises a web page.

Example 15: The display system of Example 13 or 14 wherein the circuitry is configured to: display the content within a virtual browser tile in the 3D spatial environment, and wherein the authorized portion of the 3D spatial environment comprises: a width greater than the width of the virtual browser tile; a height greater than the height of the virtual browser tile; and a depth greater than the depth of the virtual browser tile.

Example 16: The display system of Example 15, wherein the circuitry is configured to display the virtual browser tile in the authorized portion.

Example 17: The display system of any one of Examples 13-16, wherein to determine whether the content can be displayed in the authorized portion, the circuitry is configured to determine whether a threshold amount of the content can be displayed within the authorized portion.

Example 18: The display system of any one of Examples 13-17, wherein the circuitry is configured to: in response to determining that the content can be displayed in the authorized portion of the 3D spatial environment in the second orientation, display the content in the authorized portion in the second orientation.

Example 19: The display system of any one of Examples 13-18, wherein to resize the authorized portion, the circuitry is configured to: determine a resize authorization status; and resize the authorized portion based on the resize authorization status.

Example 20: The display system of any one of Examples 13-19, wherein to determine a resize authorization status, the circuitry is configured to identify an authorization based on a user input.

Example 21: The display system of any one of Examples 13-20, wherein the content is associated with a web domain and wherein to determine a resize authorization status, the circuitry is configured to identify an authorization based on whether the web domain is an authorized requestor.

Example 22: The display system of any one of Examples 13-21, wherein a resize authorization status comprises an authorization to resize the authorized portion during a current session of access to a web domain associated with the 3D content.

Example 23: The display system of any one of Examples 13-22, wherein to resize the authorized portion, the circuitry is configured to: increase the width of the authorized portion in at least one direction by a first amount; increase the height of the authorized portion in at least one direction by a second amount; and increase the depth of the authorized portion in at least one direction by a third amount.

Example 24: The display system of any one of Examples 13-23, wherein the circuitry is configured to: determine a refresh condition associated with the authorized portion; and set the size of the authorized portion to a default size.

Example 25: The display system of Example 24, wherein the refresh condition comprises at least one of: a user interaction with a web domain not associated with the content and an indication from the user to cease display of the content.

Example 26: A display system for displaying virtual content in a three-dimensional (3D) spatial environment, the display system comprising: a head-mounted display configured to present virtual content to an eye of a user of the display system; and circuitry in communication with the head-mounted display, the circuitry configured to: receive a request to access 3D content; identify parameters associated with the 3D content comprising at least one of: a location in the 3D spatial environment of the user to display the 3D content, an orientation of the 3D content, and dimensions of the 3D content; determine whether the 3D content can be displayed in an authorized portion of the 3D spatial environment of the user based on the parameters; and in response to determining that the 3D content cannot be displayed in the authorized portion of the 3D spatial environment, display a representation of the 3D content at the location in the 3D spatial environment.

Example 27: The display system of Example 26, wherein the circuitry is configured to: display a browser tile in the 3D spatial environment, and wherein the authorized portion of the 3D spatial environment comprises: a width greater than the width of the browser tile; a height greater than the height of the browser tile; and a depth greater than the depth of the browser tile.

Example 28: The display system of any one of Examples 26 or 27, wherein the circuitry is configured to display the browser tile in the authorized portion.

Example 29: The display system of any one of Examples 26-28, wherein to determine whether the 3D content can be displayed in the authorize portion, the circuitry is configured to determine whether a threshold amount of the 3D content can be displayed within the authorized portion.

Example 30: The display system of any one of Examples 26-28, wherein the circuitry is configured to: in response to determining that the 3D content can be displayed in the authorized portion of the 3D spatial environment, display the 3D content in the authorized portion.

Any of the above examples may be combined in any suitable combination.

L. Terms

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms, wherein such construction is consistent with context of the term. Thus, the descriptions below do not limit the meaning of these terms, but only provide example descriptions.

Prism: container, area, or volume associated with mixed reality content. For example, a prism may contain multiple virtual content items that are selectable by a user. A prism may spawn when an application is launched, and then may spawn sibling or child prisms to create flexible layouts. An application within a prism may be configured to control where these hierarchical prisms will appear, which is typically within the proximity of the first prism and easily discoverable by a user.

A prism may provide feedback to a user. In some embodiments, the feedback may be a title that is only displayed to the user when the prism is targeted with head pose. In some embodiments, the feedback may be a glow around the prism. Prism glow (and/or other prism feedback) may also be used in sharing to give user feedback of which prisms are being shared.

Controller: a handheld controller, such as a totem.

Controller Axis: an axis extending from the controller defining a pointing direction of the controller.

Head pose: head position and/or head orientation that is determined using sensors such as inertial measurement units (IMUs), accelerometers, gyroscopes, etc. A head pose ray that extends in the direction of the head pose may be used to interact with virtual objects. For example, when a user is pointing or looking at a prism or an object, the object or prism is intersected by the user's head pose ray.

Focus: characteristic of an object, such as a prism, that allows interactive objects to be selected.

Input Focus: characteristic of an object, such as a prism or application that causes the object's cursor to be refreshed and rendered as the active system cursor. In some implementations, there can be multiple focus objects but only one with input focus.

Browser Tile: a type of content window that can be used to navigate, display, or otherwise interact with web based content. A browser tile can be displayed in the 3D environment of the user as a 2D or 3D object that can be manipulated and interacted with.

3D Content: A virtual object that can be displayed in the 3D environment of the user. The 3D content can be static, animated, manipulable, or otherwise interacted with. 3D content can include web based content generated by user interactions with web domains or web pages using, for example, the browser tile.

Content Volume (or content stage): A content volume can include a volume of space with the environment of the user in which 3D content can be displayed or manipulated.

M. Other Considerations

Each of the processes, methods, and algorithms described herein or depicted in the attached figures may be embodied in, and fully or partially automated by, code modules executed by one or more physical computing systems, hardware computer processors, application-specific circuitry, or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations or embodiments shown herein but are to be accorded the widest scope consistent with this disclosure, the principles and the novel features disclosed herein.

Certain features that are described in this specification in the context of separate implementations or embodiments also can be implemented in combination in a single implementation or embodiment. Conversely, various features that are described in the context of a single implementation or embodiment also can be implemented in multiple implementations or embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without author input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display system for displaying virtual content in a three-dimensional (3D) spatial environment, the display system comprising:
   a head-mounted display configured to present virtual content to an eye of a user of the display system; and circuitry in communication with the head-mounted display, the circuitry configured to:
  receive a request to access 3D content that is web based;
  identify parameters associated with the 3D content comprising at least one of: a location in the 3D spatial environment of the user to display the 3D content, an orientation of the 3D content, or dimensions of the 3D content;
  determine whether a threshold amount of the 3D content can be displayed in a bounded volume of the 3D spatial environment based on the parameters;
  in response to determining that the threshold amount of the 3D content cannot be displayed in the bounded volume of the 3D spatial environment, automatically resize the bounded volume to allow display of at least the threshold amount of the 3D content in the resized bounded volume.

2. The display system of claim 1, wherein the circuitry is configured to:
  display a browser tile in the 3D spatial environment,
  wherein the bounded volume of the 3D spatial environment comprises:
    a width greater than the width of the browser tile;
    a height greater than the height of the browser tile; and
    a depth greater than the depth of the browser tile.

3. The display system of claim 2, wherein the circuitry is configured to display the browser tile in the bounded volume.

4. The display system of claim 1, wherein the circuitry is configured to:
  in response to determining that the threshold amount of the 3D content can be displayed in the bounded volume of the 3D spatial environment, display the 3D content in the bounded volume.

5. The display system of claim 1, wherein to resize the bounded volume, the circuitry is configured to:
  determine a resize authorization status; and
  resize the bounded volume based on the resize authorization status.

6. The display system of claim 5, wherein to determine the resize authorization status, the circuitry is configured to identify an authorization based on a user input.

7. The display system of claim 5, wherein the 3D content is associated with a web domain and wherein to determine the resize authorization status, the circuitry is configured to identify an authorization based on whether the web domain is an authorized requestor.

8. The display system of claim 5, wherein the resize authorization status comprises an authorization to resize the bounded volume during a current session of access to a web domain associated with the 3D content.

9. The display system of claim 1, wherein to resize the bounded volume, the circuitry is configured to:
  increase a width of the bounded volume in at least one direction by a first amount;
  increase a height of the bounded volume in at least one direction by a second amount; and
  increase a depth of the bounded volume in at least one direction by a third amount.

10. The display system of claim 1, wherein the circuitry is configured to:
  determine a refresh condition associated with the bounded volume; and
  set a size of the bounded volume to a default size.

11. The display system of claim 10, wherein the refresh condition comprises at least one of: a user interaction with a web domain not associated with the 3D content and an indication from the user to cease display of the threshold amount of the 3D content.

12. A display system for displaying virtual content in a three-dimensional (3D) spatial environment, the display system comprising:
  a head-mounted display configured to present virtual content to an eye of a user of the display system; and
  circuitry in communication with the head-mounted display, the circuitry configured to:
    receive a request to access content;
    display the content in a bounded volume of the 3D spatial environment of the user in a first orientation;
    receive a request to display the content in the 3D spatial environment of the user in a second orientation;
    determine whether a threshold amount of the 3D content can be displayed in the bounded volume of the 3D spatial environment of the user in the second orientation; and
    in response to determining that the content cannot be displayed in the bounded volume of the 3D spatial environment in the second orientation, automatically resize the bounded volume to allow display of the content in the second orientation within the resized bounded volume.

13. The display system of claim 12, wherein the content comprises a web page.

14. The display system of claim 12, wherein the circuitry is configured to:
  display the threshold amount of the 3D content within a virtual browser tile in the 3D spatial environment,
  and
  wherein the bounded volume of the 3D spatial environment comprises:
    a width greater than the width of the virtual browser tile;
    a height greater than the height of the virtual browser tile; and
    a depth greater than the depth of the virtual browser tile.

15. The display system of claim 12, wherein the circuitry is configured to:
  in response to determining that the threshold amount of the 3D content can be displayed in the bounded volume of the 3D spatial environment in the second orientation, display the threshold amount of the 3D content in the bounded volume in the second orientation.

16. The display system of claim 12, wherein to determine a resize authorization status, the circuitry is configured to identify an authorization based on a user input.

17. The display system of claim 12, wherein the content is associated with a web domain and wherein to determine a resize authorization status, the circuitry is configured to identify an authorization based on whether the web domain is an authorized requestor.

18. The display system of claim 16, wherein the resize authorization status comprises an authorization to resize the bounded volume during a current session of access to a web domain associated with the content.

19. A display system for displaying virtual content in a three-dimensional (3D) spatial environment, the display system comprising:
  a head-mounted display configured to present virtual content to an eye of a user of the display system; and
  circuitry in communication with the head-mounted display, the circuitry configured to:
    receive a request to access 3D content;

identify parameters associated with the 3D content comprising at least one of: a location in the 3D spatial environment of the user to display the 3D content, an orientation of the 3D content, and dimensions of the 3D content;

determine whether a threshold amount of the 3D content can be displayed in a bounded volume of the 3D spatial environment of the user based on the parameters; and in response to determining that the threshold amount of the 3D content cannot be displayed in the bounded volume of the 3D spatial environment, display a representation of the 3D content at the location in the 3D spatial environment.

* * * * *